US012583957B2

(12) United States Patent
Hirano et al.

(10) Patent No.: US 12,583,957 B2
(45) Date of Patent: Mar. 24, 2026

(54) FLUOROPOLYMER-CONTAINING COMPOSITION AND MOLDED ARTICLE

(71) Applicant: DAIKIN INDUSTRIES, LTD., Osaka (JP)

(72) Inventors: Seiichi Hirano, Osaka (JP); Tsuyoshi Noguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 524 days.

(21) Appl. No.: 17/264,524

(22) PCT Filed: Jul. 24, 2019

(86) PCT No.: PCT/JP2019/028985

§ 371 (c)(1),
(2) Date: Jan. 29, 2021

(87) PCT Pub. No.: WO2020/026909

PCT Pub. Date: Feb. 6, 2020

(65) Prior Publication Data

US 2021/0292451 A1 Sep. 23, 2021

(30) Foreign Application Priority Data

Jul. 30, 2018 (JP) ................................ 2018-142145

(51) Int. Cl.
*C08F 214/26* (2006.01)
*C08K 5/092* (2006.01)

(52) U.S. Cl.
CPC .......... *C08F 214/262* (2013.01); *C08K 5/092* (2013.01)

(58) Field of Classification Search
CPC ........ C08K 5/09; C08K 5/092; C08F 214/262
See application file for complete search history.

(56) References Cited

U.S. PATENT DOCUMENTS 3,686,143 A * 8/1972 Bowman ................ C08K 13/02 525/367
4,694,045 A * 9/1987 Moore ..................... C08K 5/18 525/276
8,722,780 B2 * 5/2014 Shimizu .................... C08F 8/00 526/248
2002/0183458 A1 12/2002 Grootaert et al.
2004/0214944 A1 * 10/2004 Tomihashi ........... C09D 127/12 524/544
2005/0054783 A1 3/2005 Grootaert et al.
2009/0054593 A1 2/2009 Funaki et al.
2011/0236692 A1 * 9/2011 Luo ......................... B32B 9/005 524/502
2013/0158154 A1 * 6/2013 Lyons .................. C08K 5/0025 525/370
2016/0369021 A1 * 12/2016 Manzoni ................ C08K 5/053
2017/0226336 A1 * 8/2017 Chen ...................... C08F 259/08
2020/0016874 A1 * 1/2020 Kikuchi .................. B32B 25/16
2020/0102409 A1 * 4/2020 Hattori ................ C08F 214/262
2020/0317901 A1 * 10/2020 Osumi .................... C08L 29/10

FOREIGN PATENT DOCUMENTS

CN 101426851 A 5/2009
CN 105733039 A * 7/2016
CN 106336602 A * 1/2017
CN 107652559 A * 2/2018
JP 10138267 A * 5/1998
JP 2000143919 A * 5/2000
JP 2004-533507 A 11/2004
JP 2010-275560 A 12/2010
TW 357154 B 5/1999
WO WO-2014099453 A1 * 6/2014 ............. C08F 14/22
WO WO-2017208927 A1 * 12/2017 ............... C08K 5/01
WO WO-2018225586 A1 * 12/2018 ............. C08F 14/26

OTHER PUBLICATIONS

Machine translation of CN 106336602 A, retrieved May 2023 (Year: 2023).*
Machine translation of CN 107652559 A, retrieved May 2023 (Year: 2023).*
Machine translation of CN 105733039 A, retrieved May 2023 (Year: 2023).*
American Ingredients Company, https://www.ams.usda.gov/sites/default/files/media/Calcium%20Stearate%20Petition.pdf, Sep. 26, 2001 (Year: 2001).*
Machine translation of JP 10138267 A, retrieved Oct. 2023 (Year: 2023).*

(Continued)

*Primary Examiner* — Mark Eashoo
*Assistant Examiner* — Caitlin Norine Illing
(74) *Attorney, Agent, or Firm* — Sughrue Mion, PLLC

(57) ABSTRACT

A composition including a fluorine-containing polymer, at least one carboxylic acid compound selected from a dicarboxylic acid compound having a specific structure and a monocarboxylic acid compound having a specific structure; and at least one cross-linking compounding agent selected from a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent. Also disclosed is a molded article obtained from the composition.

10 Claims, No Drawings

(56) References Cited

OTHER PUBLICATIONS

Machine translation of JP 2000143919 A, retrieved Oct. 2023 (Year: 2023).*
Jaw, "The thermal decomposition behaviors of stearic acid, paraffin wax and polyvinyl butyral", Thermochimica Acta, 367-368 (2001), 165-168 (Year: 2001).*
International Preliminary Report on Patentability with translation of the Written Opinion dated Feb. 2, 2021 from the International Bureau in International Application No. PCT/JP2019/028985.
International Search Report for PCT/JP2019/028985, dated Oct. 15, 2019.
Extended European Search Report dated Mar. 29, 2022 from the European Patent Office in EP Application No. 19844614.8.

* cited by examiner

FLUOROPOLYMER-CONTAINING COMPOSITION AND MOLDED ARTICLE

CROSS REFERENCE TO RELATED APPLICATIONS

This application is a National Stage of International Application No. PCT/JP2019/028985 filed Jul. 24, 2019, claiming priority based on Japanese Patent Application No. 2018-142145 filed Jul. 30, 2018.

TECHNICAL FIELD

The present disclosure relates to a composition comprising a fluorine-containing polymer and a molded article.

BACKGROUND ART

Compositions comprising a fluorine-containing polymer such as a fluorine-containing elastomer have excellent heat resistance, chemical resistance, solvent resistance, fuel oil resistance, and the like, and are therefore widely used to manufacture molded articles such as O-rings, hoses, stem seals, shaft seals, and diaphragms. As such a composition, for example, Patent Document 1 discloses a perfluoroelastomer composition comprising a perfluoroelastomer having a nitrogen-containing curing site and a catalyst formed by mixing an organic dicarboxylic acid represented by formula (1) or formula (2) in a ratio of 0.4 to 2 mol with respect to 1 mol of a tertiary amine.

$$HOOC—COOH \quad (1)$$

$$HOOC\text{-}A\text{-}COOH \quad (2)$$

RELATED ART

Patent Documents

Patent Document 1: Japanese Patent Laid-Open No. 2010-275560

SUMMARY OF THE INVENTION

Problem to be Solved by the Invention

An object of the present disclosure is to provide a composition comprising a fluorine-containing polymer that can provide a molded article having a small high-temperature compression set and has excellent releasability from a mold.

Means for Solving the Problem

According to the present disclosure, provided is a composition comprising a fluorine-containing polymer; at least one carboxylic acid compound selected from the group consisting of a dicarboxylic acid compound represented by formula (A) and a monocarboxylic acid compound represented by formula (B); and at least one cross-linking compounding agent selected from the group consisting of a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent (hereinafter, referred to as the "first composition of the present disclosure").

$$M^{A1}OOC—(Y^{A1})_m—COOM^{A2} \quad \text{Formula (A):}$$

In the formula, $Y^{A1}$ represents a single bond, a substituted or unsubstituted alkylene group having 1 to 3 carbon atoms, or a substituted or unsubstituted alkylene group having 2 or more carbon atoms and having an oxygen atom or cyclic structure between carbon-carbon atoms, a substituted or unsubstituted unsaturated aliphatic group, or a substituted or unsubstituted cycloalkylene group having 3 to 10 carbon atoms, $M^{A1}$ and $M^{A2}$ are the same or different and represent a cation or an alkyl group, and m is 0 or 1.

$$CX^{B1}X^{B2}{=}CX^{B3}—(CH_2)_n—COOM^{B1} \quad \text{Formula (B):}$$

In the formula, $X^{B1}$, $X^{B2}$, and $X^{B3}$ are the same or different and are H or a substituted or unsubstituted alkyl group, each $M^{B1}$ is the same or different and represents a cation or an alkyl group, and n is an integer of 0 to 5.

Further, according to the present disclosure, provided is a composition comprising a fluorine-containing polymer, a carboxylic acid compound that produces carbon dioxide at 40 to 230° C., and at least one cross-linking compounding agent selected from the group consisting of a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent (hereinafter, referred to as the "second composition of the present disclosure").

In the first and second compositions of the present disclosure, the carboxylic acid compound is preferably at least one selected from the group consisting of oxalic acid, maleic acid, acrylic acid, methacrylic acid, succinic acid, malonic acid, glutaric acid, cyclohexanedicarboxylic acid, and salts thereof and esters thereof.

In the first and second compositions of the present disclosure, the content of the carboxylic acid compound is preferably 0.05 to 3.0 parts by mass with respect to 100 parts by mass of the fluorine-containing polymer.

In the first and second compositions of the present disclosure, the cross-linking compounding agent is preferably at least one selected from the group consisting of urea, a urea derivative, an inorganic nitride, an oxazole cross-linking agent, an imidazole cross-linking agent, and a thiazole cross-linking agent.

In the first and second compositions of the present disclosure, the fluorine-containing polymer is preferably a fluorine-containing elastomer having a cyano group at a terminal of a main chain and/or in a side chain.

Further, according to the present disclosure, provided is a composition comprising a fluorine-containing polymer having an iodine atom or a bromine atom, and at least one carboxylic acid compound selected from the group consisting of a dicarboxylic acid compound represented by formula (A) and a monocarboxylic acid compound represented by formula (B) (hereinafter, referred to as the "third composition of the present disclosure").

$$M^{A1}OOC—(Y^{A1})_m—COOM^{A2} \quad \text{Formula (A):}$$

In the formula, $Y^{A1}$ represents a single bond, a substituted or unsubstituted alkylene group having 1 to 3 carbon atoms, or a substituted or unsubstituted alkylene group having 2 or more carbon atoms and having an oxygen atom or a cyclic structure between carbon-carbon atoms, a substituted or unsubstituted unsaturated aliphatic group, or a substituted or unsubstituted cycloalkylene group having 3 to 10 carbon atoms, $M^{A1}$ and $M^{A2}$ are the same or different and represent a cation or an alkyl group, and m is 0 or 1.

$$CX^{B1}X^{B2}{=}CX^{B3}—(CH_2)_n—COOM^{B1} \quad \text{Formula (B):}$$

In the formula, $X^{B1}$, $X^{B2}$, and $X^{B3}$ are the same or different and are H or a substituted or unsubstituted alkyl group, each $M^{B1}$ is the same or different and represents a cation or an alkyl group, and n is an integer of 0 to 5.

Further, according to the present disclosure, provided is a composition comprising a fluorine-containing polymer having an iodine atom or a bromine atom, and a carboxylic acid compound that produces carbon dioxide at 40 to 230° C. (hereinafter, referred to as the "fourth composition of the present disclosure").

In the third and fourth compositions of the present disclosure, the carboxylic acid compound is preferably at least one selected from the group consisting of oxalic acid, maleic acid, acrylic acid, methacrylic acid, succinic acid, malonic acid, glutaric acid, cyclohexanedicarboxylic acid, and salts thereof and esters thereof.

In the third and fourth compositions of the present disclosure, the content of the carboxylic acid compound is preferably 0.05 to 3.0 parts by mass with respect to 100 parts by mass of the fluorine-containing polymer. The third and fourth compositions of the present disclosure preferably further comprise at least one cross-linking compounding agent selected from the group consisting of a primary amine compound, a secondary amine compound, a tertiary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent.

In the third and fourth compositions of the present disclosure, the cross-linking compounding agent is preferably a peroxide cross-linking agent.

In addition, according to the present disclosure, provided is a molded article obtainable from the first, second, third, and fourth compositions of the present disclosure (hereinafter, collectively referred to as "the composition of the present disclosure").

Effects of Invention

According to the present disclosure, there can be provided a composition comprising a fluorine-containing polymer that can provide a molded article having a small high-temperature compression set, and has excellent releasability from a mold.

DESCRIPTION OF EMBODIMENTS

Specific embodiments of the present disclosure will hereinafter be described in detail. However, the present disclosure is not limited to the following embodiments.

<First and Second Compositions of the Present Disclosure>

The first and second compositions of the present disclosure contain a fluorine-containing polymer, a carboxylic acid compound, and a cross-linking compounding agent.

When a fluorine-containing polymer, such as a fluorine-containing elastomer, is molded using a mold, the fluorine-containing polymer may adhere to the mold, making it impossible to obtain a molded article with a beautiful appearance. In particular, when a crosslinkable composition containing a fluorine-containing elastomer is subjected to primary crosslinking using a mold having a complex shape or a mold having an acute-angled shape and then the molded article is taken out from the mold, there is a problem in that a release defect tends to occur. However, when a mold release agent, such as an oil or a wax, which has been conventionally known as a mold release agent, is added, the resistance to compression set at high temperature required for the fluorine-containing polymer may deteriorate even if the releasability is improved. As a result of diligent studies on means for solving this problem, the present inventors have found that releasability can be improved, without harming excellent resistance to compression set at high temperature, by using a specific carboxylic acid compound.

The composition of the present disclosure contains a fluorine-containing polymer. As the fluorine-containing polymer, a fluorine-containing elastomer is preferable because it has excellent sealing properties, chemical resistance, and heat resistance.

In the present disclosure, the fluorine-containing elastomer is an amorphous fluorine-containing polymer. "Amorphous" refers to a state in which the melting peak (ΔH) that appears in differential scanning calorimetry [DSC] (temperature-increasing rate 10° C./min) or differential thermal analysis [DTA] (temperature-increasing rate 10° C./min) of the fluorine-containing polymer is 4.5 J/g or less. Fluorine-containing elastomers exhibit elastomeric characteristics through cross-linking. "Elastomeric characteristics" means characteristics that allow the polymer to be stretched and to retain its original length when the force required to stretch the polymer is no longer applied.

The fluorine-containing elastomer may be a partially fluorinated elastomer or a perfluoroelastomer, but it is preferable to use a perfluoroelastomer from the viewpoint of having even better chemical resistance and heat resistance.

In the present disclosure, the partially fluorinated elastomer is a fluorine-containing polymer that includes a fluoromonomer unit, has a perfluoromonomer unit content of less than 90 mol % with respect to all the polymerization units, has a glass transition temperature of 20° C. or lower, and has a melting peak (ΔH) of 4.5 J/g or less.

In the present disclosure, the perfluoroelastomer is a fluorine-containing polymer that has a perfluoromonomer unit content with respect to all the polymerization units of 90 mol % or more, has a glass transition temperature of 20° C. or lower, and has a melting peak (ΔH) of 4.5 J/g or less, and further, has a fluorine atom concentration in the fluorine-containing polymer of 71% by mass or more. In the present disclosure, the fluorine atom concentration in the fluorine-containing polymer is determined by calculating the concentration (% by mass) of the fluorine atoms included in the fluorine-containing polymer from the type and content of each monomer constituting the fluorine-containing polymer.

In the present disclosure, the perfluoromonomer is a monomer that does not include a carbon atom-hydrogen atom bond in the molecule. The perfluoromonomer may be a monomer in which, in addition to carbon atoms and fluorine atoms, some of the fluorine atoms bonded to carbon atoms are replaced with chlorine atoms, and may have, other than carbon atoms, a nitrogen atom, an oxygen atom, and a sulfur atom. The perfluoromonomer is preferably a monomer in which all the hydrogen atoms are replaced with fluorine atoms. A monomer that provides a cross-linking site does not fall within the scope of the perfluoromonomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, ethylene/hexafluoropropylene (HFP)/ tetrafluoroethylene (TFE)-based fluoroelastomers, and the like. Among these, at least one selected from the group consisting of vinylidene fluoride-based fluoroelastomers and tetrafluoroethylene/propylene-based fluoroelastomers is preferable.

The vinylidene fluoride-based fluoroelastomer is preferably a copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a copolymer comprising 50 to 80 mol % of vinylidene fluoride and 50 to 20 mol % of at least one other monomer copolymerizable with vinylidene fluoride.

In the present disclosure, the content of each monomer constituting the fluorine-containing polymer can be calculated by appropriately combining NMR, FT-IR, elemental analysis, and X-ray fluorescence analysis depending on the type of monomer.

Examples of the at least one other monomer copolymerizable with vinylidene fluoride include TFE, HFP, fluoroalkyl vinyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by formula (1): $CH_2{=}CFRf^1$ wherein $Rf^1$ is a linear or branched fluoroalkyl group having 1 to 12 carbon atoms, and a fluoromonomer represented by formula (2): $CH_2{=}CH{-}(CF_2)_n{-}X^2$ wherein $X^2$ is H or F, and n is an integer of 3 to 10; a monomer that provides a crosslinking site; and a non-fluorinated monomer such as ethylene, propylene, and alkyl vinyl ether. These can be used alone or in any combination. Among these, it is preferable to use at least one selected from the group consisting of TFE, HFP, fluoroalkyl vinyl ether and CTFE.

The fluoroalkyl vinyl ether is preferably one selected from the group consisting of a fluoromonomer represented by formula (3):

$$CF_2{=}CF{-}ORf^3$$

wherein $Rf^3$ represents a perfluoroalkyl group having 1 to 8 carbon atoms;

a fluoromonomer represented by formula (4):

$$CF_2{=}CFOCF_2ORf^4$$

wherein $Rf^4$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms including 1 to 3 oxygen atoms; and a fluoromonomer represented by formula (5):

$$CF_2{=}CFO(CF_2CF(Y^5)O)_m(CF_2)_nF$$

wherein $Y^5$ represents a fluorine atom or a trifluoromethyl group, M is an integer of 1 to 4, and n is an integer of 1 to 4. More preferably, the fluoroalkyl vinyl ether is a fluoromonomer represented by formula (3).

Specific examples of the vinylidene fluoride-based fluoroelastomer include a VdF/HFP-based rubber, a VdF/HFP/TFE-based rubber, VdF/CTFE-based rubber, a VdF/CTFE/TFE-based rubber, a VDF/fluoromonomer represented by formula (1)-based rubber, a VDF/fluoromonomer represented by formula (1)/TFE-based rubber, a VDF/perfluoro (methyl vinyl ether) [PMVE]-based rubber, a VDF/PMVE/TFE-based rubber, a VDF/PMVE/TFE/HFP-based rubber and the like. The VDF/fluoromonomer represented by formula (1)-based rubber is preferably a VDF/$CH_2{=}CFCF_3$-based rubber, and the VDF/fluoromonomer represented by formula (1)/TFE-based rubber is preferably VDF/TFE/$CH_2{=}CFCF_3$-based rubber.

The VDF/$CH_2{=}CFCF_3$-based rubber is preferably a copolymer comprising 40 to 99.5 mol % of VDF and 0.5 to 60 mol % of $CH_2{=}CFCF_3$, and more preferably 50 to 85 mol % of VDF and 15 to 50 mol % of $CH_2{=}CFCF_3$.

The tetrafluoroethylene/propylene-based fluoroelastomer is preferably a copolymer comprising 45 to 70 mol % of tetrafluoroethylene, 55 to 30 mol % of propylene, and 0 to 5 mol % of fluoromonomer that provides a crosslinking site.

The fluorine-containing elastomer may be a perfluoroelastomer. Examples of the perfluoroelastomer include at least one selected from the group consisting of a perfluoroelastomer including TFE, for example, a copolymer of TFE/fluoromonomer represented by formula (3), (4), or (5), and a copolymer of TFE/fluoromonomer represented by formula (3), (4), or (5)/monomer that provides a crosslinking site.

In the case of a TFE/PMVE copolymer, the compositional features thereof are preferably 45 to 90/10 to 55 (mol %), more preferably 55 to 80/20 to 45, and further preferably 55 to 70/30 to 45.

In the case of a copolymer of TFE/PMVE/monomer that provides a crosslinking site, the compositional features thereof are preferably 45 to 89.9/10 to 54.9/0.01 to 4 (mol %), more preferably 50 to 77.9/20 to 49.9/0.1 to 3.5, and further preferably 55 to 69.8/30 to 44.8/0.2 to 3.

In the case of a copolymer of TFE/fluoromonomer represented by formula (3), (4), or (5) having 4 to 12 carbon atoms, the compositional features thereof are preferably 50 to 90/10 to 50 (mol %), more preferably 60 to 88/12 to 40, and further preferably 65 to 85/15 to 35.

In the case of a copolymer of TFE/fluoromonomer represented by formula (3), (4), or (5) having 4 to 12 carbon atoms/monomer that provides a crosslinking site, the compositional features thereof are preferably 50 to 89.9/10 to 49.9/0.01 to 4 (mol %), more preferably 60 to 87.9/12 to 39.9/0.1 to 3.5, and further preferably 65 to 84.8/15 to 34.8/0.2 to 3.

If the compositional features of these copolymers are beyond these ranges, their nature as a rubber elastic body is lost, and the copolymer tends to have a nature close to that of a resin.

Examples of the perfluoroelastomer include at least one selected from the group consisting of a copolymer of TFE/fluoromonomer represented by formula (5)/monomer that provides a crosslinking site, a copolymer of TFE/fluoromonomer represented by formula (5), a copolymer of TFE/fluoromonomer represented by formula (3), and a copolymer of TFE/fluoromonomer represented by formula (3)/monomer that provides a crosslinking site.

Examples of the perfluoroelastomer may include the perfluoroelastomers described in International Publication No. WO 97/24381, Japanese Patent Publication No. 61-57324, Japanese Patent Publication No. 4-81608, Japanese Patent Publication No. 5-13961, and the like.

The monomer that provides a crosslinking site is a monomer (cure site monomer) having a crosslinkable group that provides a fluorine-containing polymer with a crosslinking site for forming a crosslink by a cross-linking agent (cross-linking compounding agent).

The monomer that provides a crosslinking site is preferably at least one selected from the group consisting of:

a fluoromonomer represented by formula (6):

$$CX^6_2{=}CX^6{-}Rf^6CHR^6X^7$$

wherein each $X^6$ is the same or different and is a hydrogen atom, a fluorine atom, or $CH_3$, $Rf^6$ is a fluoroalkylene group, a perfluoroalkylene group, a fluoro (poly)oxyalkylene group, or a perfluoro (poly)oxyalkylene group, $R^6$ is a hydrogen atom or $CH_3$, and $X^7$ is an iodine atom or a bromine atom;

a fluoromonomer represented by formula (7):

$$CX^6_2{=}CX^6{-}Rf^7X^7$$

wherein each $X^6$ is the same or different, and is a hydrogen atom, a fluorine atom, or $CH_3$, $Rf^7$ is a fluoroalkylene group, a perfluoroalkylene group, a fluoro (poly) oxyalkylene group, or a perfluoro (poly)oxyalkylene group, and $X^7$ is an iodine atom or a bromine atom;

a fluoromonomer represented by formula (8):

$$CF_2{=}CFO(CFO)CF_2CF(CF_3)O)_m(CF_2)_n{-}X^8$$

wherein m is an integer of 0 to 5, n is an integer of 1 to 3, and $X^8$ is a cyano group, a carboxyl group, an alkoxycarbonyl group, an iodine atom, a bromine atom, or $-CH_2I$;

a fluoromonomer represented by formula (9):

$$CH_2{=}CFCF_2O(CF(CF_3)CF_2O)_m(CF(CF_3))_n{-}X^9$$

wherein m is an integer of 0 to 5, n is an integer of 1 to 3, and $X^9$ is a cyano group, a carboxyl group, an alkoxycarbonyl group, an iodine atom, a bromine atom, or $CH_2OH$; and a monomer represented by formula (10):

$$CR^{10}_2{=}CR^{10}{-}Z{-}CR^{10}{=}CR^{10}_2$$

wherein each $R^{10}$ is the same or different and is a hydrogen atom or an alkyl group having 1 to 5 carbon atoms, and Z is a linear or branched alkylene group having 1 to 18 carbon atoms which may have an oxygen atom, a cycloalkylene group having 3 to 18 carbon atoms, an alkylene group or an oxyalkylene group having 1 to 10 carbon atoms which is at least partially fluorinated, or a (per)fluoropolyoxyalkylene group having a molecular weight of 500 to 10000 and represented by $$-(Q)_p-CF_2O-(CF_2CF_2O)_m(CF_2O)_n-CF_2-(Q)_p-$$

wherein Q is an alkylene group or an oxyalkylene group, P is 0 or 1, and m/n is 0.2 to 5.

$X^6$ is preferably a fluorine atom. $Rf^6$ and $Rf^7$ are preferably a perfluoroalkylene group having 1 to 5 carbon atoms. $R^6$ is preferably a hydrogen atom. $X^8$ is preferably a cyano group, an alkoxycarbonyl group, an iodine atom, a bromine atom, or $-CH_2I$. $X^9$ is preferably a cyano group, an alkoxycarbonyl group, an iodine atom, a bromine atom, or $-CH_2OH$.

The monomer that provides the crosslinking site is preferably at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN_2$, and more preferably at least one selected from the group consisting of $CF_2{=}CFOCF_2CF(CF_3)OCF_2CF_2CN$ and $CF_2{=}CFOCF_2CF_2CH_2I$.

From the viewpoint of excellent resistance to compression set at high temperature, the fluorine-containing elastomer has a glass transition temperature of preferably −70° C. or higher, more preferably −60° C. or higher, and further preferably −50° C. or higher. Further, from the viewpoint of good cold resistance, the fluorine-containing elastomer has a glass transition temperature of preferably 5° C. or lower, more preferably 0° C. or lower, and further preferably −3° C. or lower.

The glass transition temperature is determined as follows: using a differential scanning calorimeter (DSC822e, manufactured by Mettler Toledo), a DSC curve is obtained by heating 10 mg of a sample at 10° C./min; and the temperature is read at the intermediate point of two intersections between each of the extension lines of the baselines before and after the secondary transition of the DSC curve and the tangent line at the inflection point of the DSC curve.

From the viewpoint of good heat resistance, the fluorine-containing elastomer has a Mooney viscosity ML (1+20) at 170° C. of preferably 30 or more, more preferably 40 or more, and further preferably 50 or more. Further, from the viewpoint of good processibility, the fluorine-containing elastomer has a Mooney viscosity ML of preferably 150 or less, more preferably 120 or less, and further preferably 110 or less.

The Mooney viscosity can be measured according to JIS K6300 at 170° C. by using a Mooney viscometer MV2000E manufactured by ALPHA TECHNOLOGIES.

The above-described partially fluorinated elastomer and perfluoroelastomer can be produced by a conventional method. However, from the viewpoint of a narrow molecular weight distribution of the obtained polymer, easy control of the molecular weight, and being able to introduce an iodine atom or a bromine atom to a terminal, an iodine compound or a bromine compound can also be used as a chain transfer agent. Examples of a polymerization method performed using an iodine compound or a bromine compound include a method in which emulsion polymerization is carried out in an aqueous medium under pressure in the presence of the iodine compound or the bromine compound in a substantially oxygen-free state (iodine transfer polymerization method). Typical examples of the iodine compound or bromine compound to be used include, for example, a compound represented by the formula:

$$R^{11}I_xBr_y$$

wherein x and y are each an integer of 0 to 2 and satisfy $1 \le x+y \le 2$; and $R^{11}$ is a saturated or unsaturated fluorohydrocarbon group or chlorofluorocarbon group having 1 to 16 carbon atoms or a hydrocarbon group having 1 to 3 carbon atoms, which may contain an oxygen atom. By using an iodine compound or a bromine compound, an iodine atom or a bromine atom is introduced into the polymer to function as a cross-linking point.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diode-2,4-dichloroperfluoropentane, 1,6-diiodoperfluorohexane, 1,8-diiodoperfluorooctane, 1,12-diiodoperfluorododecane, 1,16-diiodineperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, a monoiodomonobromo-substituted benzene, a diiodomonobromo-substituted benzene, and a (2-iodoethyl)-substituted benzene and a (2-bromoethyl)-substituted benzene, and the like. These compounds can be used alone or in combination together.

Among these, it is preferable to use 1,4-diiodoperfluorobutane, 1,6-diiodoperfluorohexane, or 2-iodoperfluoropropane from the viewpoint of polymerization reactivity, cross-linking reactivity, availability, and the like.

The fluorine-containing polymer is preferably a fluorine-containing elastomer having a cyano group (—CN group) at a terminal of a main chain and/or in a side chain. In a fluorine-containing elastomer having a cyano group (—CN group) at a terminal of the main chain and/or in a side chain, the cyano group can form a triazine ring by cyclization trimerization to enable crosslinking, thereby enabling the molded article to have superior resistance to compression set and heat resistance.

Examples of the fluorine-containing elastomer having a cyano group (—CN group) at a terminal of the main chain and/or in a side chain include a perfluoroelastomer and a partially fluorinated elastomer.

Examples of the perfluoroelastomer having a cyano group (—CN group) at a terminal of the main chain and/or in a side chain include, copolymers in which the monomer that provides a crosslinking site is a monomer having a cyano group (—CN group) among the above-described copolymers of TFE/fluoromonomer represented by formula (3), (4), or (5)/monomer that provides a crosslinking site. In this case, the content of the monomer unit having a cyano group (—CN group) may be 0.1 to 5 mol % with respect to the total amount of the TFE unit and the fluoromonomer unit represented by formula (3), (4), or (5), from the viewpoint of good crosslinking characteristics and heat resistance, and may even be 0.3 to 3 mol %. Even more preferable compositional features are as described above.

Further, examples of the monomer having a cyano group (—CN group) include monomers represented by the following formulas:

$$CY^1_2{=}CY^1(CF_2)_n{-}CN \quad \text{Formula:}$$

wherein each $Y^1$ is the same or different and is a hydrogen atom or a fluorine atom, and n is an integer of 1 to 8;

$$CF_2{=}CFCF_2Rf^8{-}CN \quad \text{Formula:}$$

wherein $Rf^8$ is $-(OCF_2)_n-$ or $-(OCF(CF_3))_n-$, and n is an integer of 0 to 5;

$$CF_2{=}CFCF_2(OCF(CF_3)CF_2)_m(OCH_2CF_2CF_2)_nOCH_2CF_2{-}CN \quad \text{Formula:}$$

wherein m is an integer of 0 to 5, and n is an integer of 0 to 5;

$$CF_2{=}CFCF_2(OCH_2CF_2CF_2)_m(OCF(CF_3)CF_2)_nOCF(CF_3){-}CN \quad \text{Formula:}$$

wherein m is an integer of 0 to 5, and n is an integer of 0 to 5;

$$CF_2{=}CF(OCF_2CF(CF_3))_mO(CF_2)_n{-}CN \quad \text{Formula:}$$

wherein m is an integer of 0 to 5, and n is an integer of 1 to 8;

$$CF_2{=}CF(OCF_2CF(CF_3))_m{-}CN \quad \text{Formula:}$$

wherein m is an integer of 1 to 5;

$$CF_2{=}CFOCF_2(CF(CF_3)OCF_2)_nCF({-}CN)CF_3 \quad \text{Formula:}$$

wherein n is an integer of 1 to 4;

$$CF_2{=}CFO(CF_2)_nOCF(CF_3){-}CN \quad \text{Formula:}$$

wherein n is an integer of 2 to 5;

$$CF_2{=}CFO(CF_2)_n{-}(C_6H_4){-}CN \quad \text{Formula:}$$

wherein n is an integer of 1 to 6;

$$CF_2{=}CF(OCF_2CF(CF_3))_nOCF_2CF(CF_3){-}CN \quad \text{Formula:}$$

wherein n is an integer of 1 to 2;

$$CH_2{=}CFCF_2O(CF(CF_3)CF_2O)_nCF(CF_3){-}CN \quad \text{Formula:}$$

wherein n is an integer of 0 to 5;

$$CF_2{=}CFO(CF_2CF(CF_3)O)_m(CF_2)_n{-}CN \quad \text{Formula:}$$

wherein m is an integer of 0 to 5, and n is an integer of 1 to 3;

$$CH_2{=}CFCF_2OCF(CF_3)OCF(CF_3){-}CN; \quad \text{Formula:}$$

$$CH_2{=}CFCF_2OCH_2CF_2{-}CN; \quad \text{Formula:}$$

$$CF_2{=}CFO(CF_2CF(CF_3)O)_mCF_2CF(CF_3){-}CN \quad \text{Formula:}$$

wherein m is an integer of 0 or more;

$$CF_2{=}CFOCF(CF_3)CF_2O(CF_2)_n{-}CN \quad \text{Formula:}$$

wherein n is an integer of 1 or more; and $$CF_2{=}CFOCF_2OCF_2CF(CF_3)OCF_2{-}CN. \quad \text{Formula:}$$

These monomers can be used alone or in any combination.

Among the above, a monomer represented by the formula: $CF_2{=}CF(OCF_2CF(CF_3))_mO(CF_2)_n{-}CN$ wherein m is an integer of 0 to 5, n is an integer of 1 to 8; and $CF_2{=}CFOCF_2CF(CF_3)OCF_2CF_2CN$ is more preferable.

Since these monomers have a cyano group, the cyano group undergoes a cyclization trimerization reaction, whereby triazine crosslinking proceeds.

These perfluoroelastomers can be produced by a conventional method.

Specific examples of the perfluoroelastomer may include the fluoroelastomers described in International Publication No. WO 97/24381, Japanese Patent Publication No. 61-57324, Japanese Patent Publication No. 4-81608, Japanese Patent Publication No. 5-13961, and the like.

Examples of the partially fluorinated elastomer having a cyano group (—CN group) at a terminal of the main chain and/or in a side chain include vinylidene fluoride (VdF)-based fluoroelastomers, tetrafluoroethylene (TFE)/propylene-based fluoroelastomers, tetrafluoroethylene (TFE)/propylene/vinylidene fluoride (VdF)-based fluoroelastomers, ethylene/hexafluoroethylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, fluorinesilicone-based fluoroelastomers, fluorophosphazene fluoroelastomers, and the like. These can each be used alone, or in any combination as long as the effects of the present disclosure are not impaired.

The vinylidene fluoride-based fluoroelastomer is a fluorine-containing copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a fluorine-containing copolymer comprising 50 to 80 mol % of vinylidene fluoride and 50 to 20 mol % of at least one other monomer copolymerizable with vinylidene fluoride.

Examples of the at least one other monomer copolymerizable with vinylidene fluoride include a fluoromonomer such as TFE, CTFE, trifluoroethylene, HFP, trifluoropropylene, tetrafluoropropylene, pentafluoropropylene, trifluorobutene, tetrafluoroisobutene, perfluoro (alkyl vinyl ether)

(PAVE), and vinyl fluoride, and non-fluorinated monomers such as ethylene, propylene and alkyl vinyl ether. These can be used alone or in any combination. Among these, TFE, HFP, and perfluoro (alkyl vinyl ether) are preferable.

Specific examples of the rubber include VdF-HFP-based rubber, VdF-HFP-TFE-based rubber, VdF-CTFE-based rubber, VdF-CTFE-TFE-based rubber, and the like.

The tetrafluoroethylene/propylene-based fluoroelastomer is a fluorine-containing copolymer comprising 45 to 70 mol % of tetrafluoroethylene and 55 to 30 mol % of propylene, and containing 0 to 5 mol % of a monomer that provides a crosslinking site with respect to the total amount of tetrafluoroethylene and propylene.

Examples of the monomer that provides a crosslinking site include a cyano group-containing monomer as described in Japanese Translation of PCT International Application Publication No. 4-505345 and Japanese Translation of PCT International Application Publication No. 5-5000070, the above-described monomer having a cyano group (—CN group).

These partially fluorinated elastomers can be produced by a conventional method.

Further, as the fluorine-containing elastomer, a thermoplastic fluoroelastomer comprising an elastomeric fluorine-containing polymer chain segment and a non-elastomeric fluorine-containing polymer chain segment may be used.

The first and second compositions of the present disclosure and the fluorine-containing polymer contained therein are preferably produced substantially in the absence of a metal compound as a raw material. The metal content of the first and second compositions of the present disclosure is preferably 100 ppm or less, more preferably 50 ppm or less, and further preferably 10 ppm or less. An extremely low metal content of the composition is preferable because a molded article is obtained that can be used in a semiconductor fabrication process or a pharmaceutical manufacturing process in which contamination by metal components should be avoided. The metal content can be measured by flameless atomic absorption spectrophotometry or high frequency inductively coupled plasma emission spectroscopy. The metal content in the present disclosure is the total metal content of Fe, Cr, Ni, Cu, Al, Na, Mg, Ca, Zn, Ba, and K. As the metal content of the first and second compositions of the present disclosure, the total of the content of these metals and the content of metals other than these metals may be within the above range.

The first composition of the present disclosure contains at least one carboxylic acid compound selected from the group consisting of a dicarboxylic acid compound represented by formula (A) and a monocarboxylic acid compound represented by formula (B).

The dicarboxylic acid compound is represented by formula (A):

$$M^{A1}OOC—(Y^{A1})_m—COOM^{A2}$$

wherein $Y^{A1}$ represents a single bond, a substituted or unsubstituted alkylene group having 1 to 3 carbon atoms, or a substituted or unsubstituted alkylene group having 2 or more carbon atoms and having an oxygen atom or cyclic structure between carbon-carbon atoms, a substituted or unsubstituted unsaturated aliphatic group, or a substituted or unsubstituted cycloalkylene group having 3 to 10 carbon atoms, MAL and $M^{A2}$ are the same or different and represent a cation or an alkyl group, and m is 0 or 1.

Examples of the cation of $M^{A1}$ and $M^{A2}$ in formula (A) include a hydrogen ion, an alkali metal ion, an alkaline earth metal ion, an ammonium ion, an organic ammonium ion, and the like. Examples of the alkali metal ion include a lithium ion, a potassium ion, a sodium ion, and the like. Examples of the organic ammonium ion include a cation represented by formula: $NH_3R^+$ wherein R represents an alkyl group, an alkoxy group, or a hydroxyalkyl group.

The alkyl group of $M^{A1}$ and $M^{A2}$ in formula (A) is preferably an alkyl group having 1 to 12 carbon atoms, more preferably an alkyl group having 1 to 4 carbon atoms, and further preferably a methyl group or an ethyl group. The carboxylic acid compound represented by formula (A) may be a monoester compound in which one of $M^{A1}$ and $M^{A2}$ is an alkyl group, or a diester compound in which both $M^{A1}$ and $M^{A2}$ are alkyl groups.

Due to the fact that better releasability from the mold can be achieved, $M^{A1}$ and $M^{A2}$ in formula (A) are preferably a cation, more preferably a hydrogen ion, an alkali metal ion, an alkaline earth metal ion, or an ammonium ion, and due to the fact that metal contamination can be avoided, $M^{A1}$ and $M^{A2}$ are further preferably a hydrogen ion or an ammonium ion, and particularly preferably a hydrogen ion.

$Y^{A1}$ in formula (A) represents a single bond, a substituted or unsubstituted alkylene group having 1 to 3 carbon atoms, or a substituted or unsubstituted alkylene group having 2 or more carbon atoms and having an oxygen atom or cyclic structure between carbon-carbon atoms, a substituted or unsubstituted unsaturated aliphatic group, or a substituted or unsubstituted cycloalkylene group having 3 to 10 carbon atoms. $Y^{A1}$ is preferably a single bond, a substituted or unsubstituted alkylene group having 1 to 3 carbon atoms, a substituted or unsubstituted vinylene group, or a substituted or unsubstituted cycloalkylene groups having 3 to 10 carbon atoms. Examples of the substituent include —F, —Cl, and the like.

The monocarboxylic acid compound is represented by formula (B):

$$CX^{B1}X^{B2}═CX^{B3}—(CH_2)_n—COOM^{B1}$$

wherein $X^{B1}$, $X^{B2}$, and $X^{B3}$ are the same or different and are H or a substituted or unsubstituted alkyl group, each $M^{B1}$ is the same or different and represents a cation or an alkyl group, and n is an integer of 0 to 5.

Examples of the cation of $M^{B1}$ in formula (B) include a hydrogen ion, an alkali metal ion, an alkaline earth metal ion, an ammonium ion, an organic ammonium ion, and the like. Examples of the alkali metal ion include a lithium ion, a potassium ion, a sodium ion, and the like. Examples of the organic ammonium ion include a cation represented by formula: $NH_3R^+$ wherein R represents an alkyl group, an alkoxy group, or a hydroxyalkyl group.

The alkyl group of $M^{B1}$ in formula (B) is preferably an alkyl group having 1 to 12 carbon atoms, more preferably an alkyl group having 1 to 4 carbon atoms, and further preferably a methyl group or an ethyl group.

Due to the fact that much better releasability from the mold can be achieved, $M^{B1}$ in formula (B) is preferably a cation, more preferably a hydrogen ion, an alkali metal ion, an alkaline earth metal ion, or an ammonium ion, and due to the fact that metal contamination can be avoided, $M^{B1}$ is further preferably a hydrogen ion or an ammonium ion, and particularly preferably a hydrogen ion.

$X^{B1}$, $X^{B2}$, and $X^{B3}$ in formula (B) are the same or different and represent H or a substituted or unsubstituted alkyl group. The alkyl group is preferably a substituted or unsubstituted alkyl group having 1 to 3 carbon atoms, and an unsubstituted alkyl group having 1 to 3 carbon atoms is more preferable. $X^{B1}$, $X^{B2}$, and $X^{B3}$ are preferably H or $CH_3$.

The dicarboxylic acid compound represented by formula (A) and the monocarboxylic acid compound represented by formula (B) are preferably at least one selected from the group consisting of oxalic acid, maleic acid, acrylic acid, methacrylic acid, succinic acid, malonic acid, glutaric acid, cyclohexanedicarboxylic acid, and salts thereof and esters thereof.

In the first composition of the present disclosure, the content of the at least one carboxylic acid compound selected from the group consisting of the dicarboxylic acid compound represented by formula (A) and the monocarboxylic acid compound represented by formula (B) is 0.05 to 3.0 parts by mass, more preferably 0.1 to 2.0 parts, and further preferably 0.15 to 1.0 parts by mass with respect to 100 parts by mass of the fluorine-containing polymer in terms of achieving even better releasability.

The second composition of the present disclosure contains a carboxylic acid compound that produces carbon dioxide at 40 to 230° C. The carboxylic acid compound that produces carbon dioxide at 40 to 230° C. produces carbon dioxide at the crosslinking temperature of the fluorine-containing polymer, such as a fluorine-containing elastomer, and therefore the releasability of the composition containing a fluorine-containing polymer can be improved. The carbon dioxide production temperature is preferably 150 to 200° C.

Further, the carboxylic acid compound that produces carbon dioxide is preferably a carboxylic acid compound that not only produces carbon dioxide at a primary cross-linking temperature of the fluorine-containing polymer, but also decomposes the molecule at a secondary crosslinking temperature of the fluorine-containing polymer. That is, the decomposition temperature of the carboxylic acid compound that produces carbon dioxide is preferably equal to or lower than the secondary crosslinking temperature of the fluorine-containing polymer. Further, the carboxylic acid compound that produces carbon dioxide may be a compound that does not produce ammonia.

The carboxylic acid compound that produces carbon dioxide is preferably one selected from the group consisting of oxalic acid, maleic acid, acrylic acid, methacrylic acid, succinic acid, malonic acid, glutaric acid, cyclohexanedicarboxylic acid, and salts thereof and esters thereof.

In the second composition of the present disclosure, the content of the carboxylic acid compound that produces carbon dioxide is preferably 0.05 to 3.0 parts by mass, more preferably 0.1 to 2.0 parts, and further preferably 0.15 to 1.0 parts by mass with respect to 100 parts by mass of the fluorine-containing polymer in terms of achieving even better releasability.

The first and second compositions of the present disclosure contain at least one cross-linking compounding agent selected from the group consisting of a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent.

The cross-linking compounding agent contained in the first and second compositions of the present disclosure is preferably at least one selected from the group consisting of urea, a urea derivative, an inorganic nitride, an oxazole cross-linking agent, an imidazole cross-linking agent, and a thiazole cross-linking agent. In particular, when the first and second compositions of the present disclosure contain a fluorine-containing elastomer having a cyano group (—CN group) at a terminal of the main chain and/or in a side chain as a fluorine-containing polymer, the cross-linking compounding agent is preferably at least one selected from the group consisting of urea, a urea derivative, an inorganic nitride, an oxazole cross-linking agent, an imidazole cross-linking agent, and a thiazole cross-linking agent.

The cross-linking compounding agent is a compound that contributes to the cross-linking of the fluorine-containing polymer, such as a so-called cross-linking agent, crosslinking aid, crosslinking accelerator, and crosslinking catalyst. Because, in the first and second compositions of the present disclosure, the crosslinking reaction proceeds sufficiently, and the first and second compositions of the present disclosure exhibit better scorch resistance even without using a tertiary amine as a cross-linking compounding agent, the cross-linking compounding agent used in the present disclosure preferably does not contain a tertiary amine.

In the present disclosure, "primary amine compound" means a compound having $—NH_2$ and not having —NHR (R represents an organic group) and $—NR_2$(R represents an organic group). "Secondary amine compound" means a compound having —NHR (R represents an organic group) and not having $—NR_2$(R represents an organic group). The secondary amine may have $—NH_2$ in addition to —NHR. "Tertiary amine compound" means a compound having $—NR_2$(R represents an organic group). The tertiary amine may have $—NH_2$ and —NHR in addition to $—NR_2$.

Examples of the primary amine compound include compounds represented by the formula:

$$L^1\text{-}(NH_2)_n$$

wherein $L^1$ is an n-valent cyclic or acyclic hydrocarbon group that may have a heteroatom, and n is an integer of 1 to 5. The hydrocarbon group of $L^1$ may be a saturated hydrocarbon group or an unsaturated hydrocarbon group, and the hydrogen atom may be substituted with a substituent.

Examples of the primary amine compound include urea, urea hydrochloride, thiourea, 4,4'-bis(aminocyclohexyl) methanecarbamate, 2,2-bis(3-amino-4-hydroxyphenyl) hexafluoropropane (generic name: bis(aminophenol)AF), 2,2-bis(3-amino-4-mercaptophenyl) hexafluoropropane, tetraaminobenzene, bis-3,4-diaminophenylmethane, bis-3,4-diaminophenyl ether, 2,2-bis(3,4-diaminophenyl) hexafluoropropane, and the like.

Examples of the secondary amine compound include compounds represented by the formula:

$$L^2\text{-}(NHR)_n$$

wherein $L^2$ is an n-valent cyclic or acyclic hydrocarbon group that may have a heteroatom, n is an integer of 1 to 5, and R is an organic group. The hydrocarbon group of $L^2$ may be a saturated hydrocarbon group or an unsaturated hydrocarbon group, and the hydrogen atom may be substituted with a substituent.

Examples of the secondary amine compound include biurea, biuret, hexamethylenediamine carbamate, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl] hexafluoropropane, 2,2-bis[3-amino-4-(N-perfluorophenylamino)phenyl]hexafluoropropane, 2,2-bis [3-amino-4-(N-benzylamino)phenyl]hexafluoropropane, and the like.

Examples of the urea derivative include an acylurea such as biurea, thiourea, urea hydrochloride, biuret, and acetylurea.

Examples of the inorganic nitride include, but are not particularly limited to, silicon nitride ($Si_3N_4$), lithium nitride, titanium nitride, aluminum nitride, boron nitride, vanadium nitride, and zirconium nitride. Among these, silicon nitride is preferable because nano-sized fine particles can be supplied.

Examples of the organic tin compound include tetraphenyltin, triphenyltin, and the like.

The peroxide cross-linking agent may be any organic peroxide that can easily generate a peroxy radical in the presence of heat or a redox system. Specific examples include 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, 2,5-dimethyl-2,5-di(t-butylperoxy) hexane, 2,5-dimethyl-2,5-di(t-butylperoxy)-hexin-3, benzoyl peroxide, t-butylperoxybenzene, 2,5-dimethyl-2,5-di(benzoylperoxy) hexane, t-butylperoxymaleic acid, t-butylperoxy isopropyl carbonate, 1,3-bis(t-butylperoxy isopropyl)benzene, and the like. Generally, the type of the organic peroxide and amount thereof to be used are selected in consideration of the amount of active —O—O—, decomposition temperature, and the like.

Further, the crosslinking aid that can be used when using the peroxide cross-linking agent may be a compound having a reactivity with a peroxy radical and a polymer radical. Examples thereof include polyfunctional compounds having a functional group such as $—CH{=}CH_2$, $—CH_2CH{=}CH_2$, $—CF{=}CF_2$, $—C(CF_3){=}CF_2$, $—C(CH_3){=}CF_2$, $—CF{=}CF(CF_3)$, $—CF{=}CF(CH_3)$, $—C(C_6H_5){=}CF_2$, $—CF{=}CF(C_6H_5)$, $—CH{=}CF_2$, $—CF{=}CHF$, $—C(CF_3){=}CHF$, $—CF{=}CH(CF_3)$, $—CH{=}CF(CF_3)$ and the like wherein "$C_6H_5$" represents a phenyl radical). Specific examples thereof include triallyl trimellitate, dipropagil terephthalate, diallyl phthalate, triallyl phosphate, triallyl phosphite, and 1,6-divinyldodecafluorohexane.

Examples of the cross-linking agent, or crosslinking aid used together with the cross-linking agent used in peroxide cross-linking, include compounds having at least one structure represented by formula (11):

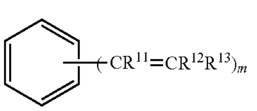

wherein $R^{11}$ to $R^{13}$ are independently a hydrogen atom, a fluorine atom, an alkyl group, a fluorinated alkyl group, or a substituted or unsubstituted aryl group, and at least one of $R^{11}$ to $R^{13}$ is a fluorine atom or a group containing a fluorine atom; m is an integer of 1 to 5; when m is 2 or more, m-number of $R^{11}$ to $R^{13}$ may be the same or different with each other; the hydrogen atoms of the benzene ring may be substituted. When m is 1, it is preferable to have two or more of the structures.

Examples of the compound having a structure represented by formula (11) include compounds represented by formula (12):

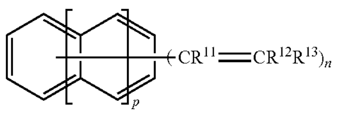

wherein $R^{11}$ to $R^{13}$ are as defined above, p is an integer of 0 to 2, and n is an integer of 2 to 6; compounds represented by formula (13):

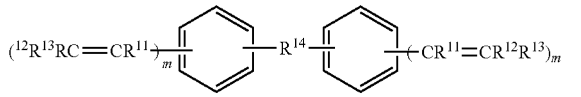

wherein $R^{11}$ to $R^{13}$ are as defined above, $R^{14}$ is a single bond, $—SO_2—$, —O—, —S—, —CO—, a heteroatom-containing group, a substituted or unsubstituted alkylene group, a substituted or substituted cycloalkylene group or a substituted or unsubstituted arylene group, m is an integer of 1 to 5; and the like.

Examples of the polyol cross-linking agent include polyhydric alcohol compounds such as bisphenol A and bisphenol AF.

Examples of the polyamine cross-linking agent include polyamine compounds such as hexamethylenediamine carbamate and 4,4'-bis(aminocyclohexyl)methane carbamate.

Examples of the oxazole cross-linking agent, the imidazole cross-linking agent, and the thiazole cross-linking agent include, for example, a bisdiaminophenyl-based cross-linking agent, a bis-aminophenol-based cross-linking agent, and a bis-aminothiophenol-based cross-linking agent represented by formula (30):

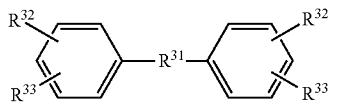

wherein $R^{31}$ is $—SO_2—$, —O—, —CO—, an alkylene group having 1 to 6 carbon atoms, a perfluoroalkylene group having 1 to 10 carbon atoms, a single bond, or a group represented by:

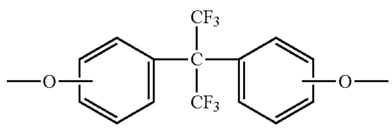

one of $R^{32}$ and $R^{33}$ is $—NH_2$ and the other is $—NHR^{34}$, $—NH_2$, —OH, or —SH, $R^{34}$ is a hydrogen atom, a fluorine atom, or a monovalent organic group, preferably $R^{32}$ is $—NH^2$ and $R^{33}$ is $—NHR^{34}$; preferred specific examples of the alkylene group having 1 to 6 carbon atoms include a methylene group, an ethylene group, a propylene group, a butylene group, a pentylene group, a hexylene group, and the like, and examples of the perfluoroalkylene group having 1 to 10 carbon atoms include:

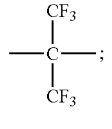

these compounds are known as examples of bisdiaminophenyl compounds in Japanese Patent Publication No. 2-59177, Japanese Patent Laid-Open No. 8-120146, and the like;

a bisamidrazone-based cross-linking agent represented by formula (31):

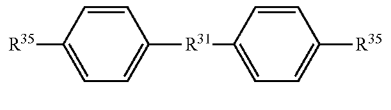

wherein $R^{31}$ is as defined above, and $R^{35}$ are independently the following group:

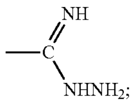

and a bisamidrazone-based compound represented by formula (32):

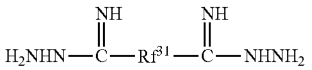

wherein $Rf^{31}$ is a perfluoroalkylene group having 1 to 10 carbon atoms. These bisaminophenol-based cross-linking agents, bisaminothiophenol-based cross-linking agents, bisdiaminophenyl-based cross-linking agents, and the like have conventionally been used in cross-linking systems that use a cyano group as a crosslinking point, but these agents also react with a carboxyl group and an alkoxycarbonyl group to form an oxazole ring, a thiazole ring, and an imidazole ring to provide a crosslinked product.

Examples of a particularly preferred cross-linking agent include a compound having a plurality of 3-amino-4-hydroxyphenyl groups or 3-amino-4-mercaptophenyl groups, or a compound represented by formula (34):

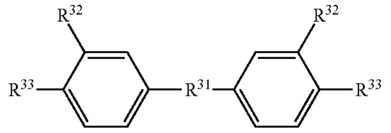

wherein $R14746^{31}$, $R^{32}$, and $R^{33}$ are as defined above. Specifically, examples include 2,2-bis(3-amino-4-hydroxyphenyl) hexafluoropropane (generic name: bis (aminophenol) μF), 2,2-bis(3-amino-4-mercaptophenyl) hexafluoropropane, tetraaminobenzene, bis-3,4-diaminophenylmethane, bis-3,4-diaminophenyl ether, 2,2-bis(3,4-diaminophenyl) hexafluoropropane, 2,2-bis [3-amino-4-(N-phenylamino)phenyl]hexafluoropropane, 2,2-bis [3-amino-4-(N-methylamino)phenyl] hexafluoropropane, 2,2-bis[3-amino-4-(N-ethylamino) phenyl]hexafluoropropane, 2,2-bis[3-amino-4-(N-propylamino)phenyl]hexafluoropropane, 2,2-bis[3-amino-4-(N-perfluorophenylamino)phenyl] hexafluoropropane, 2,2-bis[3-amino-4-(N-benzylamino)phenyl]hexafluoropropane, and the like.

Among these, the cross-linking agent is preferably 2,2-bis[3-amino-4-(N-phenylamino)phenyl]hexafluoropropane from the viewpoint of heat resistance, steam resistance, amine resistance, and good crosslinkability.

The content of the cross-linking compounding agent is preferably 0.05 to 10 parts by mass, and more preferably 0.1 to 5 parts by mass with respect to 100 parts by mass of the fluorine-containing polymer.

The first and second compositions of the present disclosure preferably do not contain a tertiary amine. For the first and second compositions of the present disclosure, scorch resistance is sufficient and the cross-linking reaction proceeds sufficiently even when a tertiary amine is not contained.

<Third and Fourth Compositions of the Present Disclosure>

The third and fourth compositions of the present disclosure contain a fluorine-containing polymer having an iodine atom or a bromine atom, and a carboxylic acid compound.

When a fluorine-containing polymer, such as a fluorine-containing elastomer, is molded using a mold, the fluorine-containing polymer may adhere to the mold, making it impossible to provide a molded article with a beautiful appearance. In particular, when a crosslinkable composition containing a fluorine-containing elastomer is subjected to primary crosslinking using a mold having a complex shape or a mold having an acute-angled shape and then the molded article is taken out from the mold, there is a problem in that a release defect tends to occur. However, when a mold release agent, such as an oil or a wax, which have been conventionally known as a mold release agent, is added, the resistance to compression set at high temperature required for the fluorine-containing polymer may deteriorate even if the releasability is improved. As a result of diligent studies on means for solving this problem, the present inventors have found that releasability can be improved, without harming excellent resistance to compression set at high temperature, by using a specific carboxylic acid compound.

Examples of the monomeric composition of the fluorine-containing polymer contained in the third and fourth compositions of the present disclosure may include, except for being required to have an iodine atom or a bromine atom, the same monomeric compositions as those of the fluorine-containing polymer of the first and second compositions of the present disclosure.

As the fluorine-containing polymer, a fluorine-containing elastomer is preferable because it has excellent sealing properties, chemical resistance, and heat resistance.

The fluorine-containing polymer has an iodine atom and a bromine atom content of preferably 0.001 to 10% by mass, more preferably 0.01% by mass or more, and further preferably 0.1% by mass or more, and more preferably 5% by mass or less.

The fluorine-containing polymer is preferably a fluorine-containing elastomer having an iodine atom or a bromine atom at a terminal of the main chain and/or in a side chain. The fluorine-containing elastomer having an iodine atom (—I) or a bromine atom (—Br) at a terminal of the main chain and/or in a side chain can be crosslinked by peroxide crosslinking, and can be used to obtain a molded article that has excellent adhesion resistance.

Examples of the monomeric composition of the fluorine-containing elastomer contained in the third and fourth compositions of the present disclosure may include, except for being required to have an iodine atom or a bromine atom, the same monomeric compositions as those of the fluorine-containing elastomer of the first and second compositions of the present disclosure.

The fluorine-containing elastomer having an iodine atom or a bromine atom at a terminal of the main chain and/or in a side chain can be produced by a conventional method. However, from the viewpoint of a narrow molecular weight distribution of the obtained polymer, easy control of the molecular weight, and being able to introduce an iodine atom or a bromine atom to a terminal, an iodine compound or a bromine compound can also be used as a chain transfer agent. Examples of a polymerization method performed using an iodine compound or a bromine compound include a method in which emulsion polymerization is carried out in an aqueous medium under pressure in the presence of the iodine compound or the bromine compound in a substantially oxygen-free state (iodine transfer polymerization method). Typical examples of the iodine compound or bromine compound to be used include, for example, a compound represented by the formula:

$$R^{11}I_xBr_y,$$

wherein x and y are each an integer of 0 to 2 and satisfy $1 \leq x+y \leq 2$; and $R^{11}$ is a saturated or unsaturated fluorohydrocarbon group or chlorofluorocarbon group having 1 to 16 carbon atoms or a hydrocarbon group having 1 to 3 carbon atoms, which may contain an oxygen atom. By using an iodine compound or a bromine compound, an iodine atom or a bromine atom is introduced into the polymer to function as a cross-linking point.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diode-2,4-dichloroperfluoropentane, 1,6-diiodoperfluorohexane, 1,8-diiodoperfluorooctane, 1,12-diiodoperfluorododecane, 1,16-diiodineperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, a monoiodomonobromo-substituted benzene, a diiodomonobromo-substituted benzene, and a (2-iodoethyl)-substituted benzene, and a (2-bromoethyl)-substituted benzene, and the like. These compounds can be used alone or in combination together.

Among these, it is preferable to use 1,4-diiodoperfluorobutane, 1,6-diiodoperfluorohexane, or 2-iodoperfluoropropane from the viewpoint of polymerization reactivity, cross-linking reactivity, availability, and the like.

Examples of the fluorine-containing elastomer having an iodine atom or a bromine atom at a terminal of the main chain and/or in a side chain include a perfluoroelastomer and a partially fluorinated elastomer, and a perfluoroelastomer is more preferable because chemical resistance and heat resistance are even better.

Examples of the perfluoroelastomer having an iodine atom or a bromine atom at a terminal of the main chain and/or in a side chain include copolymers in which the monomer that provides a crosslinking site is a monomer having an iodine atom (—I) or a bromine atom (—Br) among the above-described copolymers of TFE/fluoromonomer represented by formula (3), (4), or (5)/monomer that provides a crosslinking site. In this case, the content of the monomer unit having an iodine atom (—I) or a bromine atom (—Br) may be 0.1 to 5 mol % with respect to the total amount of the TFE unit and the fluoromonomer unit represented by formula (3), (4), or (5), and may even be 0.3 to 3 mol %, from the viewpoint of good crosslinking characteristics and heat resistance.

Further, examples of the monomer having an iodine atom (—I) or a bromine atom (—Br) include monomers represented by the following formulas:

$CY^1_2{=}CY^1(CF_2)_n{-}Y^3$ Formula:

wherein each $Y^1$ is the same or different and is a hydrogen atom or a fluorine atom, and n is an integer of 1 to 8;

$CF_2{=}CFCF_2Rf^8{-}Y^3$ Formula:

wherein $Rf^8$ is $-(OCF_2)_n$ or $-(OCF(CF_3))_n-Y^3$, and n is an integer of 0 to 5;

$CF_2{=}CFCF_2(OCF(CF_3)CF_2)_m(OCH_2CF_2CF_2)_nOCH_2CF_2{-}Y^3$ Formula:

wherein m is an integer of 0 to 5, and n is an integer of 0 to 5)

$CF_2{=}CFCF_2(OCH_2CF_2CF_2)_m(OCF(CF_3)CF_2)_nOCF(CF_3){-}Y^3$ Formula:

wherein m is an integer of 0 to 5, and n is an integer of 0 to 5;

$CF_2{=}CF(OCF_2CF(CF_3))_mO(CF_2)_n{-}Y^3$ Formula:

wherein m is an integer of 0 to 5, and n is an integer of 1 to 8;

$CF_2{=}CF(OCF_2CF(CF_3))_m{-}Y^3$ Formula:

wherein m is an integer of 1 to 5;

$CF_2{=}CFOCF_2(CF(CF_3)OCF_2)_nCF({-}Y^3)CF_3$ Formula:

wherein n is an integer of 1 to 4;

$CF_2{=}CFO(CF_2)_nOCF(CF_3){-}Y^3$ Formula:

wherein n is an integer of 2 to 5;

$CF_2{=}CFO(CF_2)_n{-}(C_6H_4){-}Y^3$ Formula:

wherein n is an integer of 1 to 6;

$CF_2{=}CF(OCF_2CF(CF_3))_nOCF_2CF(CF_3){-}Y^3$ Formula:

wherein n is an integer of 1 to 2;

$CH_2{=}CFCF_2O(CF(CF_3)CF_2O)_nCF(CF_3){-}Y^3$ Formula:

wherein n is an integer of 0 to 5;

$CF_2{=}CFO(CF_2CF(CF_3)O)_m(CF_2)_n{-}Y^3$ Formula:

wherein m is an integer of 0 to 5, and n is an integer of 1 to 3;

$CH_2{=}CFCF_2OCF(CF_3)OCF(CF_3){-}Y^3$; Formula:

$CH_2{=}CFCF_2OCH_2CF_2{-}Y^3$; Formula:

$CF_2{=}CFO(CF_2CF(CF_3)O)_mCF_2CF(CF_3){-}Y^3$ Formula:

wherein m is an integer of 0 or more;

$CF_2{=}CFOCF(CF_3)CF_2O(CF_2)_n{-}Y^3$ Formula:

wherein n is an integer of 1 or more; and $CF_2{=}CFOCF_2OCF_2CF(CF_3)OCF_2{-}Y^3$. Formula:

These monomers can be used alone or in any combination. In addition, $Y^3$ in each of the above formulas represents —I, —Br, $-CH_2I$, or $-CH_2Br$.

Among the above, a monomer represented by the formula: $CF_2{=}CF(OCF_2CF(CF_3))_mO(CF_2)_n{-}Y^3$ wherein m is an integer of 0 to 5, n is an integer of 1 to 8, and $Y^3$ represents —I, —Br, $-CH_2I$, or $-CH_2Br$).

These perfluoroelastomers can be produced by a conventional method.

Specific examples of the perfluoroelastomer may include the fluoroelastomers described in International Publication No. WO 97/24381, Japanese Patent Publication No. 61-57324, Japanese Patent Publication No. 4-81608, Japanese Patent Publication No. 5-13961, and the like.

Examples of the partially fluorinated elastomer having an iodine atom or a bromine atom at a terminal of the main chain and/or in a side chain include vinylidene fluoride (VdF)-based fluoroelastomers, tetrafluoroethylene (TFE)/propylene-based fluoroelastomers, tetrafluoroethylene (TFE)/propylene/vinylidene fluoride (VdF)-based fluoroelastomers, ethylene/hexafluoroethylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, fluorinesilicone-based fluoroelastomers, fluorophosphazene fluoroelastomers, and the like. These can each be used alone, or in any combination as long as the effects of the present disclosure are not impaired.

The vinylidene fluoride-based fluoroelastomer is a fluorine-containing copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a fluorine-containing copolymer comprising 50 to 80 mol % of vinylidene fluoride and 50 to 20 mol % of at least one other monomer copolymerizable with vinylidene fluoride.

Examples of the at least one other monomer copolymerizable with vinylidene fluoride include a fluoromonomer such as TFE, CTFE, trifluoroethylene, HFP, trifluoropropylene, tetrafluoropropylene, pentafluoropropylene, trifluorobutene, tetrafluoroisobutene, perfluoro (alkyl vinyl ether) (PAVE), and vinyl fluoride, and non-fluorinated monomers such as ethylene, propylene and alkyl vinyl ether. These can be used alone or in any combination. Among these, TFE, HFP, and perfluoro (alkyl vinyl ether) are preferable.

Specific examples of the rubber include VdF-HFP-based rubber, VdF-HFP-TFE-based rubber, VdF-CTFE-based rubber, VdF-CTFE-TFE-based rubber, and the like.

The tetrafluoroethylene/propylene-based fluoroelastomer is a fluorine-containing copolymer comprising 45 to 70 mol % of tetrafluoroethylene and 55 to 30 mol % of propylene, and containing 0 to 5 mol % of a monomer having an iodine atom or a bromine atom with respect to the total amount of tetrafluoroethylene and propylene.

These partially fluorinated elastomers can be produced by a conventional method.

Further, as the fluorine-containing elastomer, a thermoplastic fluoroelastomer comprising an elastomeric fluorine-containing polymer chain segment and a non-elastomeric fluorine-containing polymer chain segment may be used.

The third and fourth compositions of the present disclosure and the fluorine-containing polymer contained therein are preferably produced substantially in the absence of a metal compound as a raw material. The metal content of the third and fourth compositions of the present disclosure is preferably 100 ppm or less, more preferably 50 ppm or less, and further preferably 10 ppm or less. An extremely low metal content of the composition is preferable because a molded article is obtained that can be used in a semiconductor fabrication process or a pharmaceutical manufacturing process in which contamination by metal components should be avoided. The metal content can be measured by flameless atomic absorption spectrophotometry or high frequency inductively coupled plasma emission spectroscopy. The metal content in the present disclosure is the total metal content of Fe, Cr, Ni, Cu, Al, Na, Mg, Ca, Zn, Ba, and K. As the metal content of the third and fourth compositions of the present disclosure, the total of the content of these metals and the content of metals other than these metals may be within the above range.

The carboxylic acid compound contained in the third composition of the present disclosure is at least one selected from the group consisting of a dicarboxylic acid compound represented by formula (A) and a monocarboxylic acid compound represented by formula (B). Examples of the carboxylic acid compound contained in the third composition of the present disclosure include the same carboxylic acid compounds contained in the first composition of the present disclosure, and the preferred carboxylic acid compounds of the third composition of the present disclosure are also the same as the preferable carboxylic acid compounds of the first composition of the present disclosure.

In the third composition of the present disclosure, the content of the at least one carboxylic acid compound selected from the group consisting of the dicarboxylic acid compound represented by formula (A) and the monocarboxylic acid compound represented by formula (B) is preferably 0.05 to 3.0 parts by mass, more preferably 0.1 to 2.0 parts, and further preferably 0.15 to 1.0 parts by mass with respect to 100 parts by mass of the fluorine-containing polymer, in terms of achieving even better releasability.

The carboxylic acid compound contained in the fourth composition of the present disclosure is a carboxylic acid compound that produces carbon dioxide at 40 to 230° C. Examples of the carboxylic acid compound contained in the fourth composition of the present disclosure include the same carboxylic acid compounds as those contained in the second composition of the present disclosure, and the preferred carboxylic acid compounds of the fourth composition of the present disclosure are also the same as the preferred carboxylic acid compounds of the second composition of the present disclosure.

In the fourth composition of the present disclosure, the content of the carboxylic acid compound that produces carbon dioxide is preferably 0.05 to 3.0 parts by mass, more preferably 0.1 to 2.0 parts, and further preferably 0.15 to 1.0 parts by mass with respect to 100 parts by mass of the fluorine-containing polymer in terms of achieving even better releasability.

The third and fourth compositions of the present disclosure preferably contain a cross-linking compounding agent. As the cross-linking compounding agent, at least one selected from the group consisting of a primary amine compound, a secondary amine compound, a tertiary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent is preferable, and a peroxide cross-linking agent is more preferable because a fluorine-containing polymer having an iodine atom or a bromine atom can be smoothly crosslinked.

Examples of the primary and secondary amine compounds that can be included in the third and fourth compositions of the present disclosure are the same as those included in the first and second compositions of the present disclosure. In addition, the third and fourth compositions of the present disclosure may include, as a cross-linking compounding agent, a tertiary amine such as 8-benzyl-1,8-diazabicyclo[5.4.0]-7-undecene, triisocyanurate (TAIC), and the like.

The peroxide cross-linking agent may be any organic peroxide that can easily generate a peroxy radical in the presence of heat or a redox system. Specific examples include 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, 2,5-dimethyl-2,5-di(t-butylperoxy) hexane, 2,5-dimethyl-2,5-di(t-butylperoxy)-hexin-3, benzoyl peroxide, t-butylperoxybenzene, 2,5-dimethyl-2,5-di(benzoylperoxy) hexane, t-butylperoxymaleic acid, t-butylperoxy isopropyl carbonate, 1,3-bis(t-butylperoxy isopropyl)benzene, and the like. Generally, the type and amount of the organic peroxide to be used are selected in consideration of the amount of active —O—O—, decomposition temperature, and the like.

Further, the crosslinking aid that can be used in this case may be a compound having a reactivity with a peroxy radical and a polymer radical. Examples thereof include polyfunctional compounds having a functional group such as $—CH{=}CH_2$, $—CH_2CH{=}CH_2$, $—CF{=}CF_2$, $—C(CF_3){=}CF_2$, $—C(CH_3){=}CF_2$, $—CF{=}CF(CF_3)$, $—CF{=}CF(CH_3)$, $—C(C_6H_5){=}CF_2$, $—CF{=}CF(C_6H_5)$, $—CH{=}CF_2$, $—CF{=}CHF$, $—C(CF_3){=}CHF$, $—CF{=}CH(CF_3)$, $—CH{=}CF(CF_3)$ and the like wherein "$C_6H_5$" represents a phenyl radical. Specific examples thereof include triallyl cyanurate, triallyl isocyanurate (TAIC), triacryl formal, triallyl trimerite, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, 1,6-divinyldodecafluorohexane, and the like.

Examples of the cross-linking agent, or crosslinking aid used together with the peroxide cross-linking agent include compounds having at least one structure represented by formula (11):

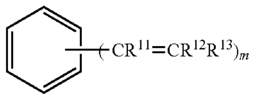

wherein $R^{11}$ to $R^{13}$ are independently a hydrogen atom, a fluorine atom, an alkyl group, a fluorinated alkyl group, or a substituted or unsubstituted aryl group, and at least one of $R^{11}$ to $R^{13}$ is a fluorine atom or a group containing a fluorine atom; m is an integer of 1 to 5; when m is 2 or more, m-number of $R^{11}$ to $R^{13}$ may be the same or different; and the hydrogen atoms of the benzene ring may be substituted with each other. When m is 1, it is preferable to have two or more of the structures.

Examples of the compound having a structure represented by formula (11) include compounds represented by formula (12):

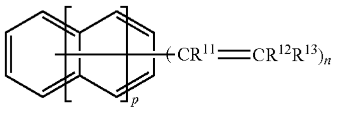

wherein $R^{11}$ to $R^{13}$ are as defined above; p is an integer of 0 to 2; and n is an integer of 2 to 6, compounds represented by formula (13):

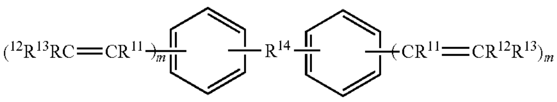

wherein $R^{11}$ to $R^{13}$ are as defined above, $R^{14}$ is a single bond, $—SO_2—$, —O—, —S—, —CO—, a heteroatom-containing group, a substituted or unsubstituted alkylene group, a substituted or unsubstituted cycloalkylene group or a substituted or unsubstituted arylene group, m is an integer of 1 to 5; and the like.

Examples of the polyol cross-linking agent include polyhydric alcohol compounds such as bisphenol A and bisphenol AF.

Examples of the polyamine cross-linking agent include polyamine compounds such as hexamethylenediamine carbamate, N,N'-dicinenamiridene-1,6-hexanediamine, and 4,4'-bis(aminocyclohexyl)methane carbamate.

Examples of the organic tin compound include tetraphenyltin and triphenyltin.

Examples of the oxazole cross-linking agent, the imidazole cross-linking agent, and the thiazole cross-linking agent include a bisdiaminophenyl-based cross-linking agent, a bis-aminophenol-based cross-linking agent, and a bis-aminothiophenol-based cross-linking agent represented by formula (40):

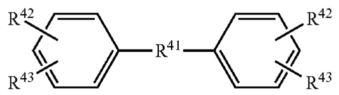

wherein $R^{41}$ is $—SO_2—$, —O—, —CO—, an alkylene group having 1 to 6 carbon atoms, a perfluoroalkylene group having 1 to 10 carbon atoms, a single bond, or a group represented by:

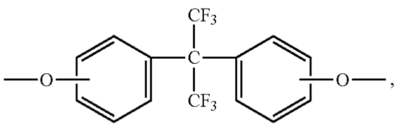

one of $R^{42}$ and $R^{43}$ is $—NH_2$ and the other is $—NHR^{44}$, $—NH_2$, —OH, or —SH, $R^{44}$ is a hydrogen atom, a fluorine atom, or a monovalent organic group, preferably $R^{42}$ is $—NH_2$ and $R^{43}$ is $—NHR^{44}$; preferred specific examples of the alkylene group having 1 to 6 carbon atoms include a methylene group, an ethylene group, a propylene group, a butylene group, a pentylene group, a hexylene group, and the like, and examples of the perfluoroalkylene group having 1 to 10 carbon atoms include:

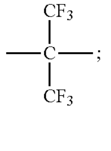

these compounds are known as examples of bisdiaminophenyl compounds in Japanese Patent Publication No. 2-59177, Japanese Patent Laid-Open No. 8-120146, and the like;

a bisamidrazone-based cross-linking agent represented by formula (41):

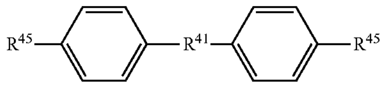

wherein $R^{41}$ is as defined above, and $R^{45}$ are independently any one of the following groups:

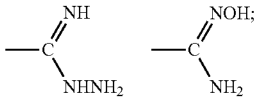

a bisamidrazone-based compound represented by formula (42):

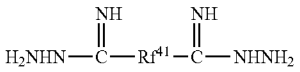

wherein $Rf^{41}$ is a perfluoroalkylene group having 1 to 10 carbon atoms; and a bisamidoxime-based cross-linking agent represented by formula (43):

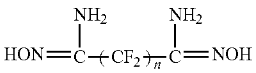

wherein n is an integer of 1 to 10.

Examples of a particularly preferable cross-linking agent include a compound having a plurality of 3-amino-4-hydroxyphenyl groups or 3-amino-4-mercaptophenyl groups, or a compound represented by formula (44):

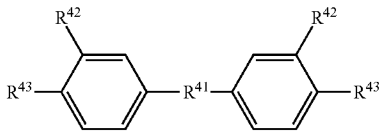

wherein $R^{41}$, $R^{42}$, and $R^{43}$ are as defined above. Specifically, examples include 2,2-bis(3-amino-4-hydroxyphenyl) hexafluoropropane (generic name: bis(aminophenol) μF), 2,2-bis(3-amino-4-mercaptophenyl) hexafluoropropane, tetraaminobenzene, bis-3,4-diaminophenylmethane, bis-3,4-diaminophenyl ether, 2,2-bis(3,4-diaminophenyl) hexafluoropropane, 2,2-bis [3-amino-4-(N-phenylamino)phenyl]hexafluoropropane, 2,2-bis [3-amino-4-(N-methylamino)phenyl] hexafluoropropane, 2,2-bis[3-amino-4-(N-ethylamino) phenyl]hexafluoropropane, 2,2-bis[3-amino-4-(N-propylamino)phenyl]hexafluoropropane, 2,2-bis[3-amino-4-(N-perfluorophenylamino)phenyl] hexafluoropropane, 2,2-bis[3-amino-4-(N-benzylamino)phenyl]hexafluoropropane, and the like.

Among these, the cross-linking agent is preferably 2,2-bis[3-amino-4-(N-phenylamino)phenyl]hexafluoropropane from the viewpoint of heat resistance, steam resistance, amine resistance, and good crosslinkability.

The content of the cross-linking compounding agent i, preferably 0.05 to 10 parts by mass, and more preferably 0.1 to 5 parts by mass with respect to 100 parts by mass of the fluorine-containing polymer.

When the third and fourth compositions of the present disclosure contain a polyol cross-linking agent, the third and fourth compositions of the present disclosure preferably further include a crosslinking accelerator. The crosslinking accelerator promotes the formation of intramolecular double bonds in the dehydrofluorination reaction of the fluoroelastomer main chain and the addition of the polyol cross-linking agent to the formed double bonds.

Examples of the crosslinking accelerator include onium compounds. Among the onium compounds, at least one selected from the group consisting of an ammonium compound such as a quaternary ammonium salt, a phosphonium compound such as a quaternary phosphonium salt, an oxonium compound, a sulfonium compound, a cyclic amine, and a monofunctional amine compound is preferable, and at least one selected from the group consisting of a quaternary ammonium salt and a quaternary phosphonium salt is more preferable.

Examples of the quaternary ammonium salt include, but are not particularly limited to, 8-methyl-1,8-diazabicyclo [5.4.0]-7-undecenium chloride, 8-methyl-1,8-diazabicyclo [5.4.0]-7-undecenium iodide, 8-methyl-1,8-diazabicyclo [5.4.0]-7-undecenium hydroxide, 8-methyl-1,8-diazabicyclo [5.4.0]-7-undecenium methyl sulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracocil-1,8-diazabicyclo[5.4.0]-7-undeceneium chloride, 8-benzyl-1,8-diazabicyclo[5.4.0]-7-undeceneium chloride (hereinafter, referred to as DBU-B), 8-benzyl-1,8-diazabicyclo[5.4.0]-7-undecenium hydroxide, 8-phenethyl-1,8-diazabicyclo[5.4.0]-7-undecenium chloride, 8-(3-phenylpropyl)-1,8-diazabicyclo[5.4.0]-7-undecenium chloride, and the like. Among these, DBU-B is preferable because of its excellent crosslinkablility and physical properties of the fluoroelastomer molded article.

Examples of the quaternary phosphonium salt include, but are not particularly limited to, tetrabutylphosphonium chloride, benzyltriphenylphosphonium chloride (hereinafter, referred to as BTPPC), benzyltrimethylphosphonium chloride, benzyltributylphosphonium chloride, tributylallylphosphonium chloride, tributyl-2-methoxypropylphosphonium chloride, benzylphenyl(dimethylamino)phosphonium chloride, and the like. Among these, benzyltriphenylphosphonium chloride (BTPPC) is preferable because of its excellent crosslinkablility and physical properties of the fluoroelastomer molded article.

The content of the crosslinking accelerator is preferably 0.05 to 5 parts by mass, and more preferably 0.10 to 3 parts by mass with respect to 100 parts by mass of the fluorine-containing polymer because a molded article having better resistance to compression set and elongation can be obtained.

The composition of the present disclosure may contain a general filler.

Examples of the general filler include an imide-based filler having an imide structure such as polyimide, polyamideimide, and polyetherimide, an organic filler made of engineering plastic such as polyarylate, polysulfone, polyethersulfone, polyphenylene sulfide, polyether ether ketone, polyether ketone, and polyoxybenzoate, a metal oxide filler such as aluminum oxide, silicon oxide, and yttrium oxide, a metal carbide such as silicon carbide and aluminum carbide, a metal nitride filler such as silicon nitride and aluminum nitride, an inorganic filler such as aluminum fluoride, carbon fluoride, barium sulfate, carbon black, silica, clay, and talc, and the like.

Among these, carbon black, aluminum oxide, yttrium oxide, silicon oxide, polyimide, and carbon fluoride are preferable from the viewpoint of a shield effect against various plasmas.

Further, the inorganic filler and organic filler may be used alone or blended in a combination of two or more thereof.

The amount of the general filler to be blended is preferably 0.5 to 100 parts by mass, and more preferably 5 to 50 parts by mass with respect to 100 parts by mass of the fluorine-containing polymer.

Especially in fields not requiring high purity and non-contamination properties, an ordinary additive that is blended in the fluorine-containing polymer composition, such as a filler, a processing aid, a plasticizer, and a colorant, can optionally be blended. One or more common cross-linking agents and cross-linking aids different from those described above may also be blended.

The composition of the present disclosure can be prepared by mixing each of the above-described components by using an ordinary polymer processing machine, for example, an open roll, a Banbury mixer, a kneader, or the like. In addition, the composition of the present disclosure can also be prepared by a method using a closed mixer. The composition can be suitably used as a molding material for obtaining a molded article by molding, and can also be suitably used as a molding material for obtaining a molded article by crosslinking and molding.

The method for obtaining a preform by using the composition of the present disclosure as a molding material may be an ordinary method, and is performed by a known method such as a method of heating and compressing in a mold, a method of press-fitting into a heated mold, and a method of extruding with an extruder. In the case of an extruded product such as a hose and an electric wire, the molded article can be obtained by heating and crosslinking with steam or the like after extrusion.

The method for obtaining the molded article from the above-described composition may be an ordinary method. The molded article can be obtained by, after obtaining the preform, performing, in order, primary crosslinking and finally secondary crosslinking. The primary crosslinking is preferably carried out at 150 to 200° C. for 5 to 120 minutes, and more preferably at 170 to 190° C. for 5 to 60 minutes. As the crosslinking means, known crosslinking means may be used, and examples thereof include press-crosslinking.

The secondary crosslinking is preferably carried out at 180 to 320° C. for 2 to 24 hours, and more preferably at 200 to 310° C. for 5 to 20 hours. As the crosslinking means, known crosslinking means may be used, and examples thereof include oven crosslinking.

The molded article of the present disclosure can be obtained from the above-described composition.

The molded article of the present disclosure can be suitably used as a sealing material for a semiconductor fabrication apparatus that particularly requires heat resistance, particularly a semiconductor fabrication apparatus in which high-density plasma irradiation is performed. Examples of the sealing material include 0-rings, square-rings, gasket, packing, oil seals, bearing seals, lip seals, and the like.

In addition, the molded article of the present disclosure can also be used as various polymer products used in semiconductor fabrication apparatus, such as diaphragms, tubes, hoses, various rubber rolls, and belts. Further, the molded article of the present disclosure can also be used as a coating material and a lining material.

As referred to herein, the "semiconductor fabrication apparatus" is not particularly limited to an apparatus for fabricating semiconductors, and widely includes general fabrication apparatus used in the semiconductor field requiring a high level of cleanliness, such as apparatus for manufacturing liquid crystal panels and plasma panels. Examples thereof include the following.

(1) Etching Apparatus
- Dry etching apparatus
- Plasma etching apparatus
- Reactive ion etching apparatus
- Reactive ion beam etching apparatus
- Sputter etching apparatus
- Ion beam etching apparatus
- Wet etching apparatus
- Ashing apparatus (2) Cleaning Apparatus Dry Etching Cleaning Apparatus
- $UV/O_3$ cleaning apparatus
- Ion beam cleaning apparatus
- Laser beam cleaning apparatus
- Plasma cleaning apparatus
- Gas etching cleaning apparatus
- Extraction and cleaning apparatus
- Soxhlet extraction cleaning apparatus
- High-temperature high-pressure extraction cleaning apparatus
- Microwave extraction cleaning apparatus
- Supercritical extraction cleaning apparatus (3) Exposure Apparatus
- Stepper
- Coater/developer (4) Polishing Apparatus
- CMP apparatus (5) Film Formation Apparatus
- CVD apparatus
- Sputtering apparatus (6) Diffusion/Ion Implantation Apparatus
- Oxidation diffusion apparatus
- Ion implantation apparatus The molded article of the present disclosure exhibits excellent performance as a sealing material for, for example, a CVD apparatus, a plasma etching apparatus, a reactive ion etching apparatus, an ashing apparatus, and an excimer laser exposure machine.

Embodiments have been described above, but it will be understood that various modifications to the modes and details may be made without departing from the spirit and scope of the claims.

EXAMPLES

Next, embodiments of the present disclosure will be described with reference to Examples, but the present disclosure is not limited to only these Examples.

The numerical values in Examples were measured by the following methods.

(Measurement of Compression Set)

As the measurement of compression set in Examples and Comparative Examples, the compression set of the 0-rings obtained after secondary crosslinking in the Examples and the Comparative Examples were determined according to JIS-K6262. Specifically, the measurement was carried out using a sample obtained by keeping the 0-rings obtained after secondary crosslinking in Examples and Comparative Examples under 25% pressure compression for 72 hours at 300° C. or 168 hours at 300° C., releasing the pressure and then leaving the O-rings for 30 minutes in a 25° C. thermostatic chamber.

(Measurement of Carbon Dioxide Production Temperature)

As the carbon dioxide production temperature, the boiling point was taken as the carbon dioxide production temperature. For substances having an unclear boiling point, the carbon dioxide production temperature was measured by thermogravimetric analysis (Hitachi High-Tech Science Corporation TG/DTA7200) by raising the temperature from 25° C. at 10° C./min in an $N_2$ atmosphere. Production example 1

2.3 liters of pure water, 23 g of emulsifier ($C_3F_7OCF(CF_3)CF_2OCF(CF_3)COONH_4$), and 0.2 g of ammonium carbonate as a pH adjuster were charged into a stainless steel autoclave having an internal volume of 6 liters and having no ignition source. The system was thoroughly purged with nitrogen gas and degassed, and then while stirring at 600 rpm, the temperature was raised to 50° C. and tetrafluoroethylene (TFE) and perfluoro(methyl vinyl ether) (PMVE) were added in a TFE/PMVE=24/76 (molar ratio) so that the internal pressure was 0.8 MPa. Then, 0.8 g of $CF_2{=}CFOCF_2CF(CF_3)OCF_2CF_2CN$ (CNVE) was introduced under nitrogen pressure. The reaction was started by introducing 10 mL of an aqueous solution of ammonium persulfate (APS) at a concentration of 1.2 g/mL under nitrogen pressure.

When the internal pressure dropped to 0.7 MPa due to the progression of polymerization, 12 g of TFE and 13 g of PMVE were introduced each under their own pressure. Then, as the reaction progressed, TFE and PMVE were introduced in the same manner, and the pressure was increased and decreased repeatedly between 0.7 and 0.9 MPa, and 1.5 g of CNVE for every 80 g of additionally added TFE and PMVE was introduced under nitrogen pressure.

When the total amount added of TFE and PMVE reached 680 g, the autoclave was cooled, and unreacted monomers were released to obtain 3110 g of an aqueous dispersion having a solid content concentration of 22% by mass.

3110 g of this aqueous dispersion were diluted with 3730 g of water, and the resultant mixture was slowly added while stirring into 3450 g of an aqueous solution of 4.8% by mass nitric acid. After stirring for 30 minutes after the addition, the coagulated product was filtered off, the obtained polymer was washed with water and then vacuum dried to obtain 680 g of a fluorine-containing elastomer.

The results of 19F-NMR analysis showed that the monomer unit compositional features of the obtained fluorine-containing elastomer were TFE/PMVE/CNVE=59.3/39.9/0.8 (mol %). Measurement by infrared spectroscopic analysis showed that the characteristic absorption of the carboxyl group was observed near 1774.9 $cm^{-1}$ and 1808.6 $cm^{-1}$, and the characteristic absorption of the OH group was observed near 3557.5 $cm^{-1}$ and 3095.2 $cm^{-1}$.

Further, the metal content of the obtained fluorine-containing elastomer was measured using the measurement method described in International Publication No. 94/28394. Specifically, a predetermined amount of a sample including the metal to be quantified was incinerated in a cuvette under ashing conditions including an ashing temperature of about 1000° C. and an ashing time of about 240 seconds, and then the absorbance of the ashed sample was measured with a flameless atomic absorption spectrophotometer. The metal content of the obtained fluorine-containing elastomer was 10 ppm or less.

Example 1

A composition was prepared by mixing the fluorine-containing elastomer having a cyano group obtained in Production Example 1, carbon black (average particle size 0.3 μm), silicon nitride ($Si_3N_4$, average particle size 30 nm), and oxalic acid (decomposition temperature 189° C., carbon dioxide production temperature 40 to 195° C.) in a mass ratio of 100/23/0.25/0.25 and kneading the obtained mixture with an open roll.

Mold releasability was evaluated as follows. The obtained composition was molded using a mold having a cavity capable of producing at one time 65 small hole diameter O-rings (inner diameter 6.5 mm, wire diameter 1.5 mm), and primary crosslinking was performed at 180° C. for 20 minutes. The mold was opened, then O-rings were removed from the mold cavity by grabbing a burr, the number of O-rings remaining in the cavity was counted (total number remaining in the upper and lower molds), and the ratio in relation to 65 O-rings (mold-remaining ratio) was calculated. The results are shown in Table 1.

A low mold-remaining ratio indicates that the composition has excellent releasability after the primary crosslinking, meaning that the O-rings can be easily removed from the mold. On the other hand, a high mold-remaining ratio indicates that the composition has poor releasability after the primary crosslinking, meaning that the O-rings stuck to the mold and were difficult to remove (when peeling the O-rings from the mold, if the adhesive force between the cavity and the rubber is stronger than the force to cut the burr and the releasability is poor, the burr is cut and the O-rings remain in the mold).

In addition, feeling at the time of releasing from the mold was classified into four stages: best, good, slightly good, and poor. The results are shown in Table 1.

Further, the obtained composition was molded using an AS-214 size mold, subjected to primary crosslinking for 20 minutes at 180° C., then removed from the mold, and placed in an oven to perform a cross linking step (secondary crosslinking) of, in order, 200° C.×12 hours, 250° C.×3 hours, and 290° C.×3 hours to prepare an O-ring for measuring compression set. The compression set of the obtained O-ring was measured by the above method. The results are shown in Table 1.

Example 2

Except that the amount of oxalic acid was changed to 0.5 parts by mass, a composition was prepared, the mold releasability was evaluated, and the compression set was measured by the same methods as in Example 1. The results are shown in Table 1.

Example 3

Except that maleic acid (carbon dioxide production temperature 140 to 180° C.) was used instead of oxalic acid, a composition was prepared, the mold releasability was evaluated, and the compression set was measured by the same methods as in Example 1. The results are shown in Table 1.

Example 4

Except that acrylic acid (carbon dioxide production temperature 141° C.) was used instead of oxalic acid, a composition was prepared, the mold releasability was evaluated, and the compression set was measured by the same methods as in Example 1. The results are shown in Table 1.

Example 5

Except that methacrylic acid (carbon dioxide production temperature 159° C.) was used instead of oxalic acid, a composition was prepared, the mold releasability was evaluated, and the compression set was measured by the same methods as in Example 1. The results are shown in Table 1.

Example 6

Except that malonic acid (carbon dioxide production temperature 155° C.) was used instead of oxalic acid, a composition was prepared, the mold releasability was evaluated, and the compression set was measured by the same methods as in Example 1. The results are shown in Table 1.

Example 7

Except that glutaric acid (carbon dioxide production temperature 170° C.) was used instead of oxalic acid, a composition was prepared, the mold releasability was evaluated, and the compression set was measured by the same methods as in Example 1. The results are shown in Table 1.

Comparative Example 1

A composition was prepared by mixing the fluorine-containing elastomer having a cyano group obtained in Production Example 1, carbon black (average particle size 0.3 μm), and silicon nitride ($Si_3N_4$, average particle size 30 nm) in a mass ratio of 100/23/0.25 and kneading the obtained mixture with an open roll. The mold releasability was evaluated, and the compression set was measured. The results are shown in Table 2.

Comparative Example 2

Except that 0.5 parts by mass of carnauba (vegetable oil) No. 1 (melting point 80° C.) was added, a composition was prepared by kneading in an oven roll, the mold releasability was evaluated, and the compression set was measured by the same methods as in Comparative Example 1. The results are shown in Table 2.

Comparative Example 3

Except that urea was used instead of silicon nitride, a composition was prepared, the mold releasability was evaluated, and the compression set was measured by the same methods as in Comparative Example 1. The results are shown in Table 2.

Comparative Example 4

Except that 2,2-bis[3-amino-4-(N-phenylamino)phenyl] hexafluoropropane (NphAF) was used instead of silicon nitride, a composition was prepared, the mold releasability was evaluated, and the compression set was measured by the same methods as in Comparative Example 1. The results are shown in Table 2.

However, the secondary crosslinking condition for preparing the O-ring for measuring compression set was changed to 290° C.×18 hours in an oven.

Comparative Example 5

Except that 0.5 parts by mass of carnauba (vegetable oil) No. 1 (melting point 80° C.) was added, a composition was prepared, the mold releasability was evaluated, and the compression set was measured by the same methods as in Comparative Example 4. The results are shown in Table 2.

Comparative Example 6

Except that 0.5 parts by mass of erucic acid amide (melting point 80° C.) was added, a composition was prepared, the mold releasability was evaluated, and the compression set was measured by the same methods as in Comparative Example 4. The results are shown in Table 2.

Comparative Example 7

Except that 0.5 parts by mass of stearyl amine (melting point 53° C.) was added, a composition was prepared, the mold releasability was evaluated, and the compression set was measured by the same methods as in Comparative Example 4. The results are shown in Table 2.

Comparative Example 8

Except that 1.0 parts by mass of diethylene glycol monomethyl ether (melting point 212° C.) was added, a composition was prepared, the mold releasability was evaluated, and the compression set was measured by the same methods as in Comparative Example 4. The results are shown in Table 2.

Comparative Example 9

Except that 1.0 parts by mass of peroxide (Perhexa 25B, manufactured by NOF Corporation) was added, a composition was prepared, the mold releasability was evaluated, and the compression set was measured by the same methods as in Comparative Example 4. The results are shown in Table 2.

TABLE 1

| | Example 1 | Example 2 | Example 3 | Example 4 | Example 5 | Example 6 | Example 7 |
|---|---|---|---|---|---|---|---|
| Composition (parts by mass) | | | | | | | |
| Fluorine-containing elastomer | 100 | 100 | 100 | 100 | 100 | 100 | 100 |
| Carbon black | 23 | 23 | 23 | 23 | 23 | 23 | 23 |
| Silicon nitride | 0.25 | 0.25 | 0.25 | 0.25 | 0.25 | 0.25 | 0.25 |
| Urea | | | | | | | |
| NphAF | | | | | | | |
| Oxalic acid | 0.25 | 0.5 | | | | | |
| Maleic acid | | | 0.25 | | | | |

TABLE 1-continued

| | Example 1 | Example 2 | Example 3 | Example 4 | Example 5 | Example 6 | Example 7 |
|---|---|---|---|---|---|---|---|
| Acrylic acid | | | | 0.5 | | | |
| Methacrylic acid | | | | | 0.5 | | |
| Malonic acid | | | | | | 0.25 | |
| Glutaric acid | | | | | | | 0.25 |
| Carnauba (vegetable oil) | | | | | | | |
| Erucic acid amide | | | | | | | |
| Stearyl amin | | | | | | | |
| Diethylene glycol monomethyl ether | | | | | | | |
| Peroxide (Perhexa 25B) | | | | | | | |
| Mold releasability | | | | | | | |
| Mold-remaining ratio (%) | 0 | 0 | 6 | 0 | 5 | 8 | 8 |
| Evaluation of feeling relating to releasability | best | best | good | good | good | best | best |
| Compression set (%) | | | | | | | |
| 300° C. × 72 hours | 17 | 22 | 26 | 18 | 23 | 17 | 18 |
| 300° C. × 168 hours | 22 | 32 | 33 | 23 | 33 | 23 | 24 |

TABLE 2

| | Example 1 Comparative | Example 2 Comparative | Example 3 Comparative | Example 4 Comparative | Example 5 Comparative | Example 6 Comparative | Example 7 Comparative | Example 8 Comparative | Example 9 Comparative |
|---|---|---|---|---|---|---|---|---|---|
| Composition (parts by mass) | | | | | | | | | |
| Fluorine-containing elastomer | 100 | 100 | 100 | 100 | 100 | 100 | 100 | 100 | 100 |
| Carbon black | 23 | 23 | 23 | 23 | 23 | 23 | 23 | 23 | 23 |
| Silicon nitride | 0.25 | 0.25 | | | | | | | |
| Urea | | | 0.3 | | | | | | |
| NphAF | | | | 0.8 | 0.8 | 0.8 | 0.8 | 0.8 | 0.8 |
| Oxalic acid | | | | | | | | | |
| Maleic acid | | | | | | | | | |
| Acrylic acid | | | | | | | | | |
| Methacrylic acid | | | | | | | | | |
| Malonic acid | | | | | | | | | |
| Glutaric acid | | | | | | | | | |
| Carnauba (vegetable oil) | | 0.5 | | | 0.5 | | | | |
| Erucic acid amide | | | | | | 0.5 | | | |
| Stearyl amin | | | | | | | 0.5 | | |
| Diethylene glycol monomethyl ether | | | | | | | | 1.0 | |
| Peroxide (Perhexa 25B) | | | | | | | | | 1.0 |
| Mold releasability | | | | | | | | | |
| Mold-remaining ratio (%) | 40 | 26 | 57 | 97 | 65 | 5 | 14 | 97 | 5 |
| Evaluation of feeling relating to releasability | poor | slightly good | poor | poor | slightly good | slightly good | slightly good | slightly good | slightly good |
| Compression set (%) | | | | | | | | | |
| 300° C. × 72 hours | 17 | 44 | 43 | 23 | 49 | 34 | 40 | 35 | 41 |
| 300° C. × 168 hours | 21 | — | — | 36 | 62 | 48 | 53 | 47 | 53 |

The invention claimed is:

1. A composition comprising:

a fluorine-containing polymer, the fluorine-containing polymer being a perfluoroelastomer having a cyano group at a terminal of a main chain and/or in a side chain;

at least one carboxylic acid compound selected from the group consisting of a dicarboxylic acid compound represented by formula (A) and a monocarboxylic acid compound represented by formula (B), and at least one cross-linking compounding agent selected from the group consisting of a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent, wherein a content of the carboxylic acid compound is 0.05 to 3.0 parts by mass with respect to 100 parts by mass of the fluorine-containing polymer:

$$M^{A1}OOC—(Y^{A1})_m—COOM^{A2}$$ Formula (A):

wherein $Y^{A1}$ represents a single bond, a substituted or unsubstituted alkylene group having 1 to 3 carbon atoms, or a substituted or unsubstituted alkylene group having 2 or more carbon atoms and having an oxygen atom or cyclic structure between carbon-carbon atoms, a substituted or unsubstituted unsaturated aliphatic group, or a substituted or unsubstituted cycloalkylene group having 3 to 10 carbon atoms, $M^{A1}$ and $M^{A2}$ are the same or different and represent a cation or an alkyl group, and m is 1; when $Y^{A1}$ is a single bond, $M^{A1}$ and $M^{A2}$ are the same or different and are a hydrogen ion or an ammonium ion; and $$CX^{B1}X^{B2}{=}CX^{B3}{-}(CH_2)_n{-}COOM^{B1} \quad \text{Formula (B):}$$

wherein $X^{B1}$, $X^{B2}$, and $X^{B3}$ are the same or different and are H or a substituted or unsubstituted alkyl group, each $M^{B1}$ is a hydrogen ion, and n is an integer of 0 to 5.

2. A composition comprising:

a fluorine-containing polymer, the fluorine-containing polymer being a fluorine-containing elastomer having a cyano group at a terminal of a main chain and/or in a side chain;

a carboxylic acid compound that produces carbon dioxide at 40 to 200° C.; and at least one cross-linking compounding agent selected from the group consisting of a primary amine compound, a secondary amine compound, an inorganic nitride, an organic tin compound, a peroxide cross-linking agent, a polyol cross-linking agent, a polyamine cross-linking agent, an oxazole cross-linking agent, an imidazole cross-linking agent, and a thiazole cross-linking agent.

3. The composition according to claim 1, wherein the carboxylic acid compound is at least one selected from the group consisting of oxalic acid, maleic acid, succinic acid, malonic acid, glutaric acid, cyclohexanedicarboxylic acid, ammonium oxalate, and a salt of maleic acid, succinic acid, malonic acid, glutaric acid, or cyclohexanedicarboxylic acid; and an ester of maleic acid, succinic acid, malonic acid, glutaric acid, or cyclohexanedicarboxylic acid.

4. The composition according to claim 1, wherein the cross-linking compounding agent is at least one selected from the group consisting of urea, a urea derivative, an inorganic nitride, an oxazole cross-linking agent, an imidazole cross-linking agent, and a thiazole cross-linking agent.

5. A moldable composition comprising:

a fluorine-containing polymer having an iodine atom or a bromine atom, the fluorine-containing polymer being a perfluoroelastomer;

at least one carboxylic acid compound selected from the group consisting of a dicarboxylic acid compound represented by formula (A) and a monocarboxylic acid compound represented by formula (B); and a cross-linking compounding agent, wherein the moldable composition only contains, as the cross-linking compounding agent, at least one cross-linking compounding agent selected from the group consisting of a primary amine compound, a secondary amine compound, a tertiary amine compound, an inorganic nitride, an organic tin compound, a peroxide cross-linking agent, a polyamine cross-linking agent, an oxazole cross-linking agent, an imidazole cross-linking agent, and a thiazole cross-linking agent, and a content of the carboxylic acid compound is 0.05 to 3.0 parts by mass with respect to 100 parts by mass of the fluorine-containing polymer:

$$M^{A1}OOC{-}(Y^{A1})_m{-}COOM^{A2} \quad \text{Formula (A):}$$

wherein $Y^{A1}$ represents a single bond, a substituted or unsubstituted alkylene group having 1 to 3 carbon atoms, or a substituted or unsubstituted alkylene group having 2 or more carbon atoms and having an oxygen atom or cyclic structure between carbon-carbon atoms, a substituted or unsubstituted unsaturated aliphatic group, or a substituted or unsubstituted cycloalkylene group having 3 to 10 carbon atoms, $M^{A1}$ and $M^{A2}$ are the same or different and represent a cation or an alkyl group, and m is 1; when $Y^{A1}$ is a single bond, $M^{A1}$ and $M^{A2}$ are the same or different and are a hydrogen ion or an ammonium ion;

$$CX^{B1}X^{B2}{=}CX^{B3}{-}(CH_2)_n{-}COOM^{B1} \quad \text{Formula (B):}$$

wherein $X^{B1}$, $X^{B2}$, and $X^{B3}$ are the same or different and are H or a substituted or unsubstituted alkyl group, each $M^{B1}$ is a hydrogen ion, and n is an integer of 0 to 5.

6. The moldable composition according to claim 5, wherein the carboxylic acid compound is at least one selected from the group consisting of oxalic acid, maleic acid, succinic acid, malonic acid, glutaric acid, cyclohexanedicarboxylic acid, ammonium oxalate; and a salt of maleic acid, succinic acid, malonic acid, glutaric acid, or cyclohexanedicarboxylic acid; and an ester of maleic acid, succinic acid, malonic acid, glutaric acid, or cyclohexanedicarboxylic acid.

7. The moldable composition according to claim 5, wherein the cross-linking compounding agent is a peroxide cross-linking agent.

8. A molded article obtained from the composition according to claim 1.

9. The composition according to claim 1, wherein the carboxylic acid compound is at least one selected from the group consisting of acrylic acid and methacrylic acid.

10. The moldable composition according to claim 5, wherein the carboxylic acid compound is at least one selected from the group consisting of acrylic acid and methacrylic acid.

* * * * *